United States Patent [19]
Nakai et al.

[11] Patent Number: 5,789,088
[45] Date of Patent: Aug. 4, 1998

[54] MAGNETIC RECORDING MEDIUM HAVING A METAL UNDERLAYER AND A COCR ALLOY MAGNETIC THIN FILM

[75] Inventors: Junichi Nakai; Kazuo Yoshikawa; Eisuke Kusumoto; Hiromi Matsumura; Takashi Miyamoto, all of Kobe, Japan

[73] Assignee: Kabushiki Kaisha Kobe Seiko Sho, Kobe, Japan

[21] Appl. No.: 427,874

[22] Filed: Apr. 26, 1995

[30] Foreign Application Priority Data

| Apr. 28, 1994 | [JP] | Japan | 6-092171 |
| Jan. 25, 1995 | [JP] | Japan | 7-010187 |
| Mar. 13, 1995 | [JP] | Japan | 7-053015 |
| Mar. 13, 1995 | [JP] | Japan | 7-053016 |

[51] Int. Cl.$^6$ .................................................. G11B 5/64
[52] U.S. Cl. .................... 428/611; 428/667; 428/668; 428/694 T; 428/694 TS; 428/457; 428/900
[58] Field of Search ........................ 428/611, 667, 428/668, 694 T, 694 TS, 900, 457

[56] References Cited

U.S. PATENT DOCUMENTS

| 5,143,794 | 9/1992 | Suzuki et al. | 428/611 |
| 5,147,734 | 9/1992 | Nakamura et al. | 428/694 |
| 5,334,267 | 8/1994 | Taniguchi et al. | 148/425 |
| 5,352,501 | 10/1994 | Miyamoto et al. | 428/64 |
| 5,422,072 | 6/1995 | Mitsuhashi et al. | 420/436 |

*Primary Examiner*—Stevan A. Resan
*Attorney, Agent, or Firm*—Oblon, Spivak, McClelland, Maier & Neustadt, P.C.

[57] ABSTRACT

Disclosed is magnetic recording media having a high coercivity sufficient to cope with the recent high density recording, low noise property and excellent squareness, and a target for forming a magnetic film useful for realizing the magnetic recording media. The magnetic film is made of a Co based alloy containing: Cr in an amount of 8–18 atomic %; one kind or more of elements selected from a group consisting of V, Mo and W in an amount of 3–10 atomic %, or one kind or more of the elements and Ta in an amount of 3–10 atomic %; Pt in an amount of 0.5 to 20 atomic % or Ni in an amount of 5–30 atomic %, as needed; and the balance being Co and inevitable impurities, wherein the total content of Cr and one kind or more of the elements selected from a group consisting of V, Mo and W, or of Cr and one kind or more of the elements and Ta is specified to be 24 atomic % or less. A target for forming the magnetic film is formed by melting, casting and hot-rolling the Co alloy having the above composition, and it has a maximum permeability of 100 or less.

11 Claims, 12 Drawing Sheets

F I G. 1
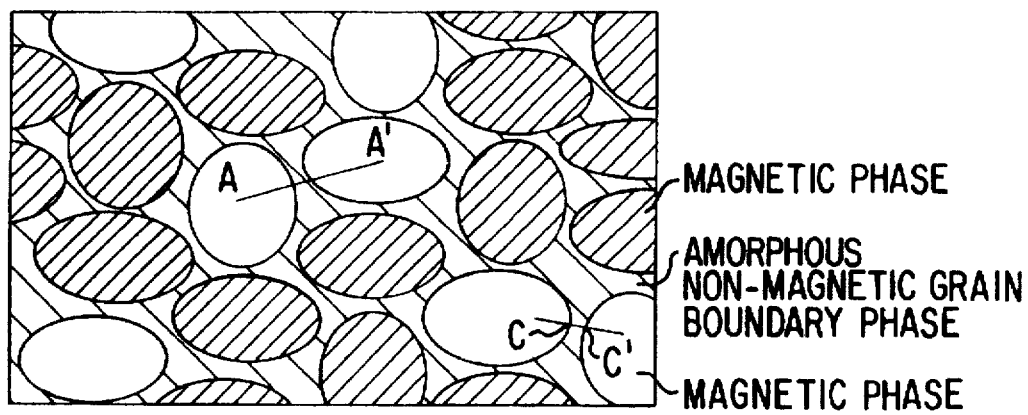
F I G. 2
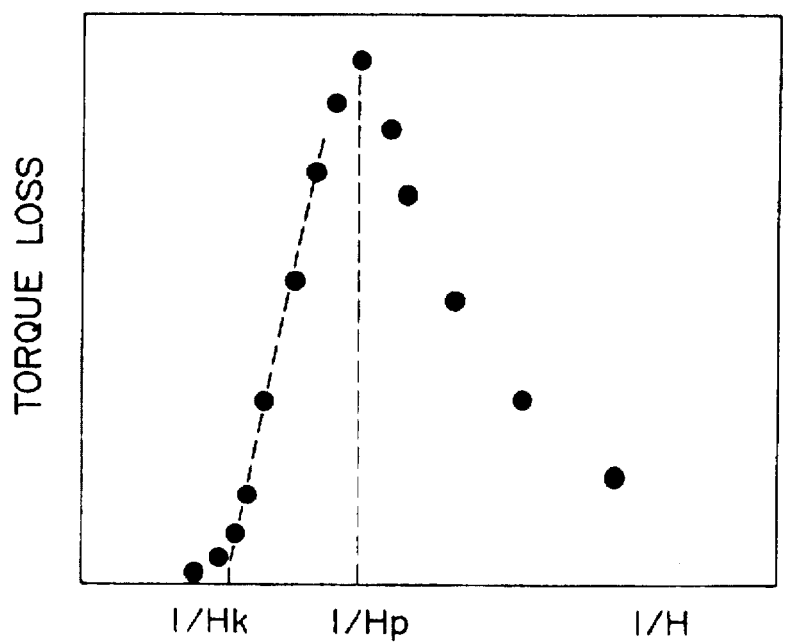

FILM SURFACE

CROSS-SECTION OF
[Cr/Co ALLOY]
THIN FILM

Si SUBSTRATE

Co ALLOY LAYER
(MAGNETIC FILM)

Cr LAYER(UNDERLAYER)

[Al/NiP]SUBSTRATE

F I G. 12
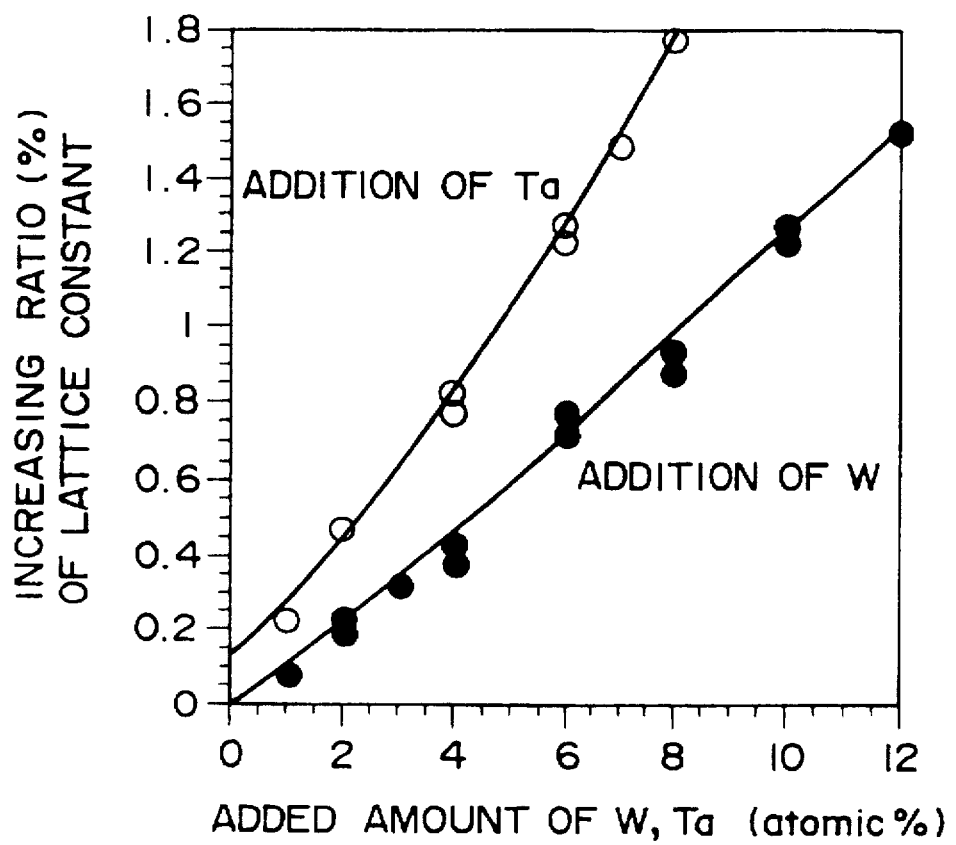

1

MAGNETIC RECORDING MEDIUM HAVING A METAL UNDERLAYER AND A COCR ALLOY MAGNETIC THIN FILM

BACKGROUND OF THE INVENTION

1. Field of the Invention

The present invention relates to ferromagnetic metal thin film magnetic recording media useful for various magnetic recording apparatuses such as computers and data processors, and to a sputtering target used for forming a magnetic film of the ferromagnetic metal thin film magnetic recording media. In particular, the present invention concerns magnetic recording media having a high coercivity, low noise property and excellent squareness, and to a sputtering target for forming a magnetic film thereby realizing the magnetic recording media.

2. Description of the Related Art

The so-called coated media have been conventionally used for magnetic recording apparatuses. In the coated media, a magnetic film is formed by coating a non-magnetic substrate with organic binder resin and ferromagnetic oxide powder. However, to meet the recent strong requirement for high density recording, the above coated media have been shifted into ferromagnetic metal thin film magnetic recording media having a ferromagnetic metal thin film obtained by a thin film formation method such as sputtering. The composition of such a ferromagnetic metal thin film is determined on the basis of the total evaluation for magnetic properties, recording performance, corrosion resistance, and sputtering applicability. In this regard, a Co based alloy having a hexagonal closed packed crystal structure has been generally used as the ferromagnetic metal thin film.

It has been known that when the above Co based alloy film is used as a magnetic film of magnetic recording media, the magnetic properties such as coercivity and thereby the recording performance such as reproduced signal are significantly improved by orienting the C-axis, easy axis of magnetization, of the crystal to be in parallel to the recording plane. This can be achieved by forming an underlayer (non-magnetic metal underlayer) of pure Cr on a substrate and then epitaxially forming the magnetic film of a Co based alloy thereon. The underlayer functions also to improve the adhesiveness between the magnetic film and substrate. In general, to improve the protective performance, corrosion resistance and wear resistance of the magnetic film, a protective layer made of carbon (C) or the like is also formed on the surface of the magnetic film. Co based alloys such as a Co—Cr alloy, Co—Ni alloy, and Co—Cr—Ni alloy have been used for the above-described magnetic film. However, in recent years, the following Co based alloys have come to be used: a Co—Cr—Pt alloy and Co—Cr—Pt—B alloy each having large magnetic anisotropy (for example, described in "IEEE TRANSACTIONS ON MAGNETICS" Vol. 27, No. 6, November, 1991, p. 4736–4738), or a Co—Cr—Ta alloy having small media noise generated upon reproduction of information. Moreover, studies have been made to develop a Co—Cr—Ta—Pt alloy having large magnetic anisotropy and small media noise (for example, described in Unexamined Japanese Patent Publication No. HEI 1-256017).

As described above, there has been a strong requirement in magnetic recording apparatuses towards high density recording, and to meet the requirement, the magnetic media have been required for the properties suitable for high density recording: ① low media noise (low noise property), ② high coercivity Hc, and ③ excellent squareness (high squareness ratio S). The prior art Co based alloys used for the magnetic film, however, have the following disadvantages.

As compared with the coated media, the Co—Cr alloy, Co—Ni alloy, and Co—Cr—Ni alloy enable high density recording; however, they are poor in intergranular magnetic de-coupling, causing high media noise which is inconvenient for reproduction of information, and further they are small in magnetic anisotropy and are thus poor in coercivity. The Co—Cr—Pt alloy or Co—Cr—Pt—B alloy, in which Pt and/or B are added to the Co—Cr alloy for enhancing the magnetic anisotropy, is suitable to increase a coercivity Hc and thereby to enhance recording density. Such an alloy, however, is difficult to reduce media noise because of a strong intergranular magnetic coupling.

It is known that in thin film media, several hundreds of crystal grains form a magnetic cluster by intergranular magnetic interaction, and the cluster thus formed generates, as a unit of magnetization reversal process, irregular zigzag transition in a magnetization transition region between recording bits, thus causing media noise. Accordingly, to reduce media noise, it is effective to cut-off the intergranular magnetic interaction and to magnetically isolate individual crystal grains. In other words, the media noise can be reduced by interposing a non-magnetic phase between ferromagnetic crystal grains for cutting-off the intergranular magnetic interaction, just as in the prior art coated media. The reference, [IEEE TRANSACTIONS ON MAGNETICS] (Vol. 27, No. 6, p. 5058–5060, November, 1991 describes a multi-layer film having a laminated structure of putting a non-magnetic layer between magnetic layers, for example, [Co alloy magnetic layer/Cr non-magnetic layer/Co alloy magnetic layer]. This reference shows that the thickness of the non-magnetic phase sufficient to cut-off the intergranular interaction is 2.5 nm or more.

In the above-described Co—Cr—Ta alloy improved in the magnetic de-coupling, a Cr rich non-magnetic second phase produced in crystal grain boundaries cuts-off the intergranular magnetic interaction, that is, achieves the intergranular magnetic de-coupling. This increases linear recording density upon high density recording, thus reducing noise. In particular, the media noise upon reproduction can be reduced. This Co—Cr—Ta alloy, however, is small in magnetic anisotropy, so that it is limited in increasing the coercivity Hc; and further, since this alloy is poor in the squareness, it is reduced in S/N as an index of the performance of reproduction. In particular, when a Co—Cr—Ta alloy magnetic film having a film thickness of 250 Å or less is used for a magnetic recording apparatus with an MR head, the S/N is extremely lowered because of the significantly reduced squareness.

In the above-described Co—Cr—Ta alloy, to meet the requirement for high density recording, an attempt has been made to increase the Cr content for forming a non-magnetic grain boundary phase or to increase the Ta content for accelerating the additional effect of Cr; however, such an attempt has the following problems. For example, Unexamined Japanese Patent Publication No. HEI 2-306419 discloses that the Ta content is preferably within a range not to reduce the output amplitude, that is, 5 atomic % or less. Unexamined Japanese Patent Publication No. HEI 3-241516 discloses that the Ta content is preferably within a range not to reduce the S/N, that is, 4 atomic % or less. Unexamined Japanese Patent Publication No. HEI 2-292715 discloses that the Cr content is preferably within a range not to lower the output due to reduction in residual magnetization Brt, and not to reduce the S/N, that is, 15 atomic % or less. In summary, an increase in the added amount of a non-magnetic element such as Ta or Cr causes a reduction in magnetization in a magnetic film, thereby causing a problem in lowering the output amplitude. The excessive addition of a non-magnetic element also reduces the magnetic anisotropy of a magnetic film and lowers the coercivity which is essential for high density recording, thus reducing a high coercivity and high S/N as the performances of a magnetic film used for high density recording media.

The Co—Cr—Ta—Pt alloy, in which Pt is added to the Co—Cr—Ta alloy for improving the magnetic anisotropy, is very large in magnetic anisotropy, and achieves a high coercivity Hc, that is, it is suitable for high density recording; however, it is poor in the squareness of the magnetostatic property because of the addition of Ta, to thus reduce the S/N. The same is true for the Co—Cr—Ta—Pt—B alloy.

A Co—Ni—Cr—Ta quaternary alloy has been proposed for improving the magnetostatic property such as coercivity Hc in the Co—Cr—Ta ternary alloy. In this alloy, Ta is added to the Co—Ni—Cr alloy which has been known to be high in the crystal magnetic anisotropy. For example, Unexamined Japanese Patent Publication No. HEI 1-237925 discloses a Co—Ni—Cr—Ta alloy thin film, wherein when the atomic ratio of Co/Ni is 7:3, a high crystal magnetic anisotropy is obtained, and further, when Ta is additionally contained, a high coercivity Hc is obtained. Unexamined Japanese Patent Publication No. HEI 2-276017 discloses a Co—Ni—Cr—Ta alloy thin film, wherein when the added amount of Ta is 5 atomic % or less, a high coercivity Hc is obtained. Unexamined Japanese Patent Publication No. HEI 2-23511 discloses a Co—Ni—Cr—Ta alloy thin film, wherein when the added amount of Ta is in the range of 1 to 3 atomic %, a transition width is reduced and media noise is lowered, and further a high coercivity Hc can be obtained. In the above-described quaternary alloys containing Ta, crystal magnetic anisotropy and magnetic de-coupling of crystal grains are improved required for a high coercivity Hc; however, it has been reported that when the added amount of Ta is approximately in the range of from 3 to 5 atomic %, the effect of improving the properties is saturated, and the excessive addition over the above value rather reduces the output amplitude, and thereby lowers the S/N. The reason for this is as follows: namely, as described in Unexamined Japanese Patent Publication No. HEI 2-113419, the addition of Ta accelerates the intergranular segregation of Cr and produces the intergranular de-coupling; however, at the same time, it increases the lattice constant of the Co alloy, to deteriorate the lattice matching with the Cr underlayer, thereby orienting the C axis, easy axis of magnetization, of the Co alloy from the recording plane to the vertical direction.

From the viewpoint of improving the properties of ferromagnetic metal thin film magnetic recording media, the following techniques have been proposed; however, they have some problems. For example, Unexamined Japanese Patent Publication No. SHO 63-98824 discloses magnetic recording media having a structure obtained by mixing oxygen or oxygen plasma upon film formation for forming an oxidized phase in boundaries of columnar structure, thereby de-coupling crystal grains. However, in this technique, oxygen atoms are inevitable to be entrapped in a magnetic phase, to reduce the preferred orientation of crystal grains of the magnetic film, thereby lowering the coercivity to some extent. Unexamined Japanese Patent Publication No. HEI 3-63919 discloses magnetic recording media wherein individual crystal grains of a magnetic film are substantially isolated by voids at grain boundaries, thus reducing the intergranular magnetic interaction. However, it is easily understood that such a structure will be made poor in corrosion resistance.

On the other hand, as for a sputtering target used for forming the above-described ferromagnetic metal thin film, it is essential to improve the efficiency. In general, a Co alloy film is formed using a magnetron sputtering method for improving the film deposition rate. In this method, however, leakage magnetic flux component parallel to the surface of the target material is large, and the erosion rate of the target material is maximized at a portion where the vertical component is minimized. Namely, such a portion is most susceptible to impact of sputter gas ions and eroded. It is difficult to equalize the parallel components of leakage flux density by a limitation in the construction of the apparatus, thereby essentially generating a local consumption of the target. In particular, in a ferromagnetic target such as a Co alloy, when local erosion is generated once, the magnetic flux confined in the target is leaked from the eroded portion, so that the local erosion is further accelerated, thus significantly lowering the efficiency. In view of the foregoing, there is required a target for forming a magnetic film enabling high density recording, which is low in permeability, eliminates the generation of local erosion, and improves the efficiency.

OBJECT OF THE INVENTION

An object of the present invention is to provide magnetic recording media having a high coercivity sufficient to cope with the recent high density recording, low noise property, and excellent squareness.

Another object of the present invention is to provide a target for forming a magnetic film useful for realizing the above-described magnetic recording media.

SUMMARY OF THE INVENTION

To achieve the above object, according to one aspect of the present invention, there is provided magnetic recording media comprising: a substrate made of a non-magnetic material; and a non-magnetic metal underlayer, a magnetic film and a protective film, which are sequentially laminated on the substrate, the magnetic film being made of a Co based alloy containing: Cr in an amount of 8–18 atomic %; one kind or more of elements selected from a group consisting of V, Mo and W in an amount of 3–10 atomic %, or one kind or more of the elements and Ta in an amount of 3–10 atomic %; and the balance being Co and inevitable impurities, wherein the total content of Cr and one kind or more of the elements selected from a group consisting of V, Mo and W, or the total content of Cr and one kind or more of the elements and Ta, is specified to be 24 atomic % or less. The Co based alloy constituting the magnetic film may contains Pt in an amount of 0.5–20 atomic % or Ni in an amount of 5–30 atomic %.

In the above magnetic recording media, preferably, a ferromagnetic phase having a columnar crystal structure is formed, and a non-magnetic phase is formed in crystal boundaries of the ferromagnetic phase. Preferably, the non-magnetic phase has a thickness of 2.5 nm or more, and which is mainly composed of an amorphous phase containing intermetallic compound fine crystals of Co and one kind or more of elements selected from a group consisting of V, Mo and W, or of Co and one kind or more of the elements and Ta. In addition, the non-magnetic metal underlayer is preferably made of Cr.

The above magnetic recording media preferably exhibit the following properties.

(a) The lattice constant of the Co based alloy constituting the magnetic film in the state before being added with Pt or a Co based alloy having the same composition as that of the Co based alloy constituting the magnetic film except that Pt is not contained, is 100–101.4% of that of pure Co having a hexagonal closed packed crystal structure, and the non-magnetic metal underlayer is made of Cr.

(b) The magnetic film has a squareness ratio along the recording direction is 0.8 or more.

(c) A magnitude of an anisotropic magnetic field in crystal grains forming the magnetic film, which is obtained by linear extrapolation in a high magnetic field region of a rotational hysteresis loss curve, is 4 kOe or more.

(d) A magnetic de-coupling of crystal grains, which is defined by the ratio between a magnitude of a magnetic field imparting the maximum value of the rotational hysteresis loss curve and a magnitude of the anisotropic magnetic field, is 0.3 or more. In addition, the magnetic de-coupling may be 0.4 or more.

According to another aspect of the present invention, there is provided a sputtering target being formed by a method of melting, casting and hot-rolling a Co based alloy containing: Cr in an amount of 8–18 atomic %; one kind or more of elements selected from a group consisting of V, Mo, and W in an amount of 3–10 atomic %, or one kind or more of the elements and Ta in an amount of 3–10 atomic %; Pt in an amount of 0.5–20 atomic % or Ni in an amount of 5–20 atomic %, as needed; and the balance being Co and inevitable impurities, the total content of Cr and one kind or more of the elements selected from a group consisting of V, Mo and W, or of Cr and one kind or more of the elements and Ta being specified to be 24 atomic % or less, and wherein the target has a maximum permeability of 100 or less.

BRIEF DESCRIPTION OF THE DRAWINGS

FIG. 1 is a TEM picture of a dark field image of the cross-section of an inventive magnetic film;

FIG. 2 is a view for illustrating a method of measuring an anisotropic magnetic field Hk and a magnetic de-coupling (Hp/Hk);

FIG. 12 is a graph showing the relationship between the effect of the added amount of W or Ta in an alloy film on an increasing ratio of a lattice constant;

DETAILED DESCRIPTION OF THE INVENTION

Figure 3:
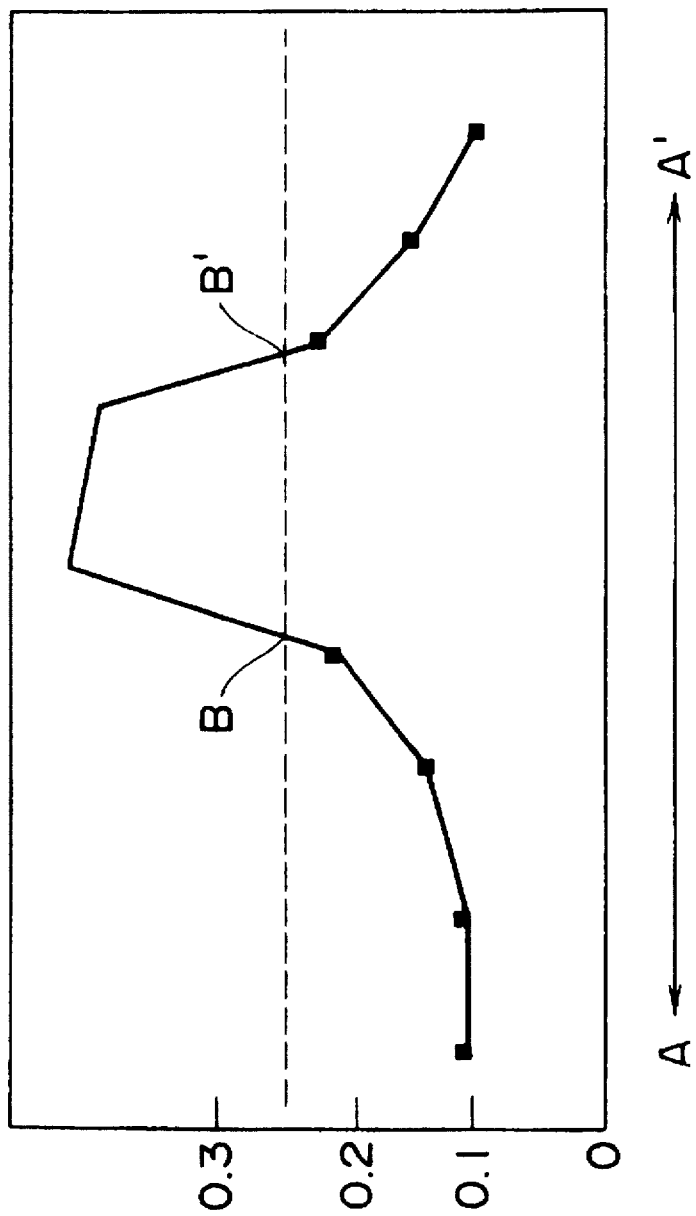
FIG. 3 is a graph showing the relationship between an analysis position and a value of {[solute Cr+solute second added element]/[total Co−intermetallic compound Co+solute Cr+solute second added element]} calculated by the result of analysis performed in the vicinity of grain boundaries of an inventive magnetic film.

On the basis of the prior art techniques, the present inventors have examined the effects of the chemical composition and crystal structure of a magnetic film on the magnetic properties for realizing high quality magnetic recording media. As a result, it was found that a magnetic film composed of a Co based alloy having a strictly specified chemical composition (including additional elements) exhibits a microstructure having a columnar crystal structure and also having an intergranular non-magnetic phase, and it can realize the desired properties. Based on the above knowledge, the present invention has been accomplished. In addition, the intergranular non-magnetic phase has a thickness (the distance B–B' shown in FIG. 1, described later) of 2.5 nm or more required for cutting-off the intergranular magnetic interaction, and it is mainly composed of an amorphous phase having intermetallic compound fine crystals containing one kind or more of elements selected from a group consisting of V, Ta, Mo and W, the balance being Co.

The amorphous grain boundary phase becomes a non-magnetic phase by the following effect of the intermetallic compound fine crystals of Co and additional elements; namely, the intermetallic compound fine crystals of Co, and one kind or more of elements selected from a group consisting of V, Mo and W, or one kind or more of the elements and Ta (hereinafter, referred to as the second additional elements) are formed in grain boundaries, so that the ratio of [solute Cr+solute second additional elements] relative to Co in a grain boundary phase excluding the intermetallic compound is considered to be increased. At this time, when Cr is used as an underlayer, the ratio of [solute Cr+solute second additional elements] relative to Co is preferably increased by the diffusion of Cr from the underlayer accelerated by the fact that the grain boundary phase is composed of the amorphous phase. Consequently, as is apparent from a Co—Cr alloy bulk material, the ratio of [solute Cr+solute second additional elements] relative to Co can be specified at a value necessary for exhibiting the non-magnetic property, that is, 25 atomic % or more. In other words, by the combination of segregation of Cr in crystal boundaries, enrichment of Cr due to precipitation of intermetallic compounds, and enrichment of Cr due to the diffusion from the Cr underlayer to grain boundaries, a preferably non-magnetic grain boundary phase can be obtained. However, the material used as the underlayer is not restricted to Cr, and may include a non-magnetic material such as V, Ta, W and Ti or a Cr alloy added with such an element.

The basic chemical composition of an alloy of a magnetic film constituting the magnetic recording media of the present invention will be described below. The alloy contains Cr in an amount of 8–18 atomic %; one kind or more of elements selected from a group consisting of V, Mo and W in an amount of 3–10 atomic % or one kind or more of the elements and Ta in an amount of 3–10 atomic %; and the balance being Co and inevitable impurities, wherein the total content of Cr and one kind or more of the elements selected from a group consisting of V, Mo and W, or of Cr and one kind or more of the elements and Ta is specified to be 24 atomic % or less.

By the addition of the additional elements of 3 atomic % or more to the Co—Cr alloy containing 8 atomic % or more of Cr, a non-magnetic grain boundary phase having the above-described characteristics which is mainly composed of an amorphous phase having intermetallic compound fine crystals of Co and the additional elements and which has a thickness of 2.5 nm or more, is formed in a grain boundary portion. When the Cr content is more than 18 atomic % or more, or the content of the additional elements is more than 10 atomic %, the saturation magnetic flux density Bs is reduced, which lowers the output amplitude to the extent practically unusable as the magnetic recording media. When Cr is excessively added, the amount of solute Cr in the Co alloy is increased, so that the saturated magnetization is made to be under the level usable as the magnetic recording media, and a high magnetic anisotropy Hk and a high coercivity Hc as the feature of the present invention cannot be achieved. In this regard, the content of Cr in the magnetic film constituting the magnetic recording media of the present invention is specified to be within the range of from 8 to 18 atomic %.

However, even in the case where the Cr content is 18 atomic % or less and the content of the second additional elements is 10 atomic % or less, when the total content of Cr and the second additional elements is more than 24 atomic %, the saturation magnetic flux density Bs is reduced as described above. Accordingly, the total content of Cr and the second additional elements is required to be 24 atomic % or less.

As described above, by specifying the basic chemical composition of the Co based alloy magnetic film, there can be obtained a magnetic film structure capable of accelerating the magnetic de-coupling of a magnetic phase. As compared with a magnetic film having an oxide phase in grain boundaries, the film achieves the magnetic de-coupling of crystal grains without reduction of the preferred orientation of crystal grains due to the entrapment of oxygen in the magnetic phase, and further it ensures strength, hardness and toughness as the feature of the amorphous phase.

In the magnetic film constituting the recording media of the present invention, the lattice constant is desirably matched with that of the Cr underlayer, thus increasing the squareness ratio S. This is effective to improve the output amplitude of the recording media; to keep the anisotropic magnetic field Hk at a high level; and to cut off the intergranular magnetic interaction between crystal grains, leading to a high coercivity Hc required for high density recording and a low noise property.

In the Co—Cr—Ta alloy magnetic film generally used at present, it is reported that by the segregation of Cr in crystal grain boundaries and the formation of a Cr rich non-magnetic grain boundary phase, the intergranular magnetic interaction is cut-off, so that a higher coercivity Hc and a lower noise property required for high density recording as compared with the conventional Co—Cr—Ni alloy film can be achieved. Moreover, it is known that the additional effect of Ta in this alloy is to accelerate the segregation of Cr in crystal grain boundaries, and accordingly, the combined addition of Cr and Ta is effective to obtain the desirable magnetic film. However, the present inventors have examined the above Co—Cr—Ta alloy magnetic film and found that the addition of Ta increases the lattice constant of Co crystals at a ratio of about 0.21% per one atomic % of Ta. As a result, pure Co or a Co—Ni—Cr alloy is desirably matched with a Cr underlayer; however, Ta hinders the lattice matching with the Cr underlayer, to obstruct the preferred orientation of the C-axis, easy axis of magnetization, of the Co alloy along the recording surface, thus reducing the squareness ratio S.

The magnetic recording media of the present invention is characterized by the addition of the above-described second additional elements (hereinafter, in some cases, represented by W) to a magnetic film made of a Co—Cr alloy, Co—Cr—Ni alloy or a Co—Cr—Pt alloy. In this case, the additional effect of W is as follows. Similarly to the addition of Ta, the addition of W accelerates the segregation of Cr in crystal grain boundaries, and cuts off the intergranular magnetic interaction, thus achieving a high magnetic de-coupling. However, in the case of the addition of W, the lattice constant of Co crystals is increased only at a ratio of about 0.12% per one atomic % of W, different from the case of the addition of Ta, so that as compared with the case where Ta is added in the same amount, the lattice matching with the Cr underlayer can be desirably kept, thus ensuring an extremely high squareness ratio S. Namely, the Co based alloy of the present invention is very different from the prior art Co based alloy containing Ta in suppressing an increase in the lattice constant of the alloy more than that of the Co based alloy containing Ta. The improved properties are particularly advantageous in increasing an anisotropic magnetic field Hk of the Co alloy and to ensure a high coercivity Hc. The reason for this is that, in the case where the easy axis of magnetization has a vertical component deviated from the recording surface, the magnetization is easier to be oriented in the vertical direction by increasing an anisotropic magnetic field Hk, thus further reducing the squareness ratio S. Namely, by the addition of W to the Co based alloy improved in the anisotropic magnetic field by the addition of Ni or Pt, the above-described additional effect of W can be sufficiently achieved.

Incidentally, even in the case of the addition of W, it is difficult to make zero an increase in the lattice constant, and thereby the added amount of W must be specified in the range not to reduce a squareness ratio S. The added amount of W is also required to be specified at the minimum value capable of achieving the accelerating the segregation of Cr simultaneously added in crystal grain boundaries and cutting off the intergranular magnetic interaction. In this regard, the added amount of the second additional elements in the magnetic film constituting the magnetic recording media of the present invention is specified to be in the range of from 3 to 10 atomic %.

The magnetic film constituting the magnetic recording media of the present invention may be added with Pt, as needed. The additional effect of Pt is as follows. Namely, the Co based alloy of the present invention is added with Pt as needed for increasing a magnetic anisotropy, thereby ensuring a high coercivity by the effect of the increased magnetic anisotropy in combination with a high magnetic de-coupling.

In the Co—Cr—W—Pt alloy of the present invention, the matching with the Cr underlayer is excellent as compared with the Co—Cr—Ta—Pt alloy, so that the degree of the orientation of the C-axis of the Co crystals along the recording surface is increased, which leads to high squareness. Moreover, in this Co based alloy, since the Cr-rich non-magnetic layer is sufficiently formed in grain boundaries, the increased magnetic interaction generally recognized for a material having a high squareness is not observed, and the media noise is reduced.

The above-described squareness in the Co based alloy of the present invention is significantly enhanced when the thickness of the magnetic film is made smaller, particularly, when the thickness is 250 Å or less. This is because, in the Co based alloy of the present invention, particularly in the case of Co—Cr—W—Pt alloy, the crystallinity is excellent at the initial growth stage, as compared with the prior art Co—Cr—Ta—Pt alloy.

When Pt is added to the Co—Cr—W alloy having a relatively small magnetic interaction between fine crystal grains for improving a magnetic de-coupling, the magnetic interaction between fine crystal grains is little affected by the addition of Pt. This is a new knowledge proposed by the present invention. Moreover, the combined effect of both a high squareness due to the excellent magnetic de-coupling and the preferred orientation of the Co—Cr—W alloy, and a high magnetic anisotropy of the Co—Cr—Pt alloy can be obtained by the chemical composition specified by the present invention.

To improve magnetic anisotropy, Pt is required to be added in an amount of 5 atomic % or more. However, when the Pt content is more than 20 atomic %, the residual magnetic flux density becomes small to the extent practically unusable as the magnetic recording media.

The magnetic film constituting the magnetic recording media of the present invention may be added with Ni, as needed. The Ni content in the Co based alloy containing Cr and W in the above-described range is specified for achieving a high magnetic anisotropy Hk and a high coercivity Hc. From this viewpoint, the Ni content in the magnetic film constituting the magnetic recording media of the present invention is specified in the range of from 5 to 30 atomic %. When the Ni content is less than 5 atomic %, the high magnetic anisotropy Hk and the high coercivity Hc cannot be achieved. When it is more than 30 atomic %, the concentration of Co atoms is reduced, and thereby the high magnetic anisotropy Hk and the high coercivity Hc cannot be also achieved.

The above-described magnetic film may be basically formed using sputtering. However, for forming an amorphous phase in a grain boundary phase in the sputter film, amorphous phase forming elements must be preferentially segregated in columnar boundaries of the film. To produce such segregation, the mobility of atoms flying on the substrate is required to be increased. In this regard, it is effective to heat the substrate and to impart a bias voltage, upon film formation. In particular, when the W content for accelerating the formation of the amorphous phase in crystal boundaries is as small as 3–5 atomic % or less, it is important to increase the substrate temperature upon film formation. By selection of the condition upon formation of a magnetic film as described above, there can be obtained magnetic recording media having a high coercivity and a low media noise.

The temperature required for heating a substrate upon film formation is preferably in the range of from about 100° to 250° C. (Al based substrate), and particularly, it is preferably specified at about 250° C. in the case where the W content is less than 3 to 5 atomic %. The bias voltage for a substrate is preferably specified to be in the range of from −50 to −200 V. However, the substrate temperature specified as described above is for the case using an Al substrate. For a substrate made of carbon or glass, the upper limit of the substrate temperature can be increased up to about 400° C.

In formation of the above magnetic film by sputtering, a sputtering target composed of a Co based alloy having the same chemical composition as that of the magnetic film. By the use of such a Co based alloy target, there can be obtained a magnetic film in which the composition of the Co based alloy of the magnetic film is easier to be stabilized, as compared with the case of co-sputtering using a target including individual elements. Moreover, in the above target prepared by melting, casting and hot-rolling, the maximum permeability thereof can be reduced to be 100 or less. This is advantageous in relaxing local erosion of the target thereby enhancing the efficiency.

The magnetic recording media of the present invention is obtained by forming the above magnetic film on a substrate made of a non-magnetic material by way of the above non-magnetic metal underlayer. The material of the above substrate may include an Al alloy (applied with Ni—P plating, as needed), Si, carbon, and glass. In some cases, the substrate is subjected to surface treatment such as texturing for improving the squareness; however, in the present invention, it becomes possible to obtain excellent squareness without such a treatment, and accordingly, the process can be omitted or simplified.

The present invention will be more clearly understood with reference to the following examples.

EXAMPLE 1

A non-magnetic substrate was prepared by forming a NiP alloy on the surface of a disk-like Al alloy substrate by electroless plating. On this non-magnetic substrate, a Cr underlayer, a magnetic film composed of a Co—Cr alloy or Co—Cr (C, Ta, Mo or W) alloy shown in Table 1 (Inventive Example) and Table 2 (Comparative Example), and a protective film were formed by DC magnetron sputtering, thus obtaining the magnetic recording media having a magnetic film of a structure shown in FIG. 1. FIG. 1 is a schematical drawing of a TEM picture of a dark field image of the cross-section of a magnetic film of the present invention.

At this time, each film thickness was set as follows: 1000 Å for the Cr underlayer, 500 Å for the magnetic film, and 300 Å for the carbon protective film. The film formation was made by sputtering at a back pressure of lower than $1\times10^{-6}$ Torr, an Ar gas pressure of 1 mTorr, a substrate temperature of 200° C. or 250° C., and a substrate bias voltage of −200 V. In addition, upon formation of the above-described magnetic film, a target having the same composition as that of the magnetic film was used.

TABLE 1

| | No. | Alloy Composition (Atomic %) | | | | | Substrate Temperature (°C.) |
|---|---|---|---|---|---|---|---|
| | | Co | Cr | Mo | V | Ta | W | |
| Inventive Example | 1 | 87 | 8 | 5 | — | — | — | 200 |
| | 2 | 87 | 8 | — | 5 | — | — | 200 |
| | 3 | 82 | 12 | 3 | 3 | — | — | 200 |
| | 4 | 77 | 14 | 9 | — | — | — | 200 |
| | 5 | 77 | 14 | — | 9 | — | — | 200 |
| | 6 | 87 | 8 | — | — | — | 5 | 200 |
| | 7 | 84 | 10 | — | — | — | 6 | 200 |
| | 8 | 82 | 12 | — | — | — | 6 | 200 |
| | 9 | 80 | 12 | — | — | — | 8 | 200 |
| | 10 | 76 | 14 | — | — | — | 10 | 200 |
| | 11 | 77 | 18 | — | — | 3 | 2 | 200 |
| | 12 | 79 | 16 | — | — | — | 5 | 200 |
| | 13 | 77 | 17 | — | — | — | 6 | 200 |
| | 14 | 78 | 18 | — | — | 2 | 2 | 200 |
| | 15 | 77 | 17 | — | — | 2 | 4 | 200 |
| | 16 | 83 | 14 | — | 1 | 0 | 2 | 250 |
| | 17 | 83 | 14 | — | 0 | 1 | 2 | 250 |
| | 18 | 87 | 10 | — | 0 | 0 | 3 | 250 |

TABLE 2

| | No. | Alloy Composition (Atomic %) | | | | | Substrate Temperature (°C.) |
|---|---|---|---|---|---|---|---|
| | | Co | Cr | Mo | V | Ta | W | |
| Comparative Example | 19 | 89 | 6 | — | 5 | — | — | 200 |
| | 20 | 75 | 14 | 11 | — | — | — | 200 |
| | 21 | 75 | 16 | 9 | — | — | — | 200 |
| | 22 | 85 | 15 | — | — | — | — | 200 |
| | 23 | 89 | 6 | — | — | 5 | — | 200 |
| | 24 | 86 | 14 | — | — | — | — | 200 |
| | 25 | 89 | 6 | — | — | — | 5 | 200 |
| | 26 | 75 | 14 | — | — | — | 11 | 200 |
| | 27 | 74 | 16 | — | — | — | 10 | 200 |
| | 28 | 75 | 18 | — | — | 5 | 2 | 200 |
| | 29 | 76 | 20 | — | — | 4 | — | 200 |
| | 30 | 77 | 22 | — | — | — | 1 | 200 |
| | 31 | 84 | 14 | 2 | — | — | — | 250 |
| | 32 | 84 | 14 | — | — | 2 | 0 | 250 |
| | 33 | 83 | 15 | — | — | — | 2 | 250 |
| | 34 | 82 | 16 | — | — | 1 | 1 | 250 |

The media having the magnetic film were evaluated in terms of saturation magnetic flux density Bs, coercivity Hc, Hp/Hk as a magnetic de-coupling index, and thickness of a grain boundary phase (amorphous grain boundary phase or non-magnetic grain boundary phase). The saturation magnetic flux density Bs and the coercivity Hc were measured using a vibrating sample magnetometer (VSM). The Hp/Hk as a magnetic de-coupling was measured by a method, shown in FIG. 2, based on the dependency of rotational hysteresis loss on the magnetic field using a torque magnetometer. Specifically, in FIG. 2, Hp is a magnitude of a magnetic field giving the maximum value of the rotational hysteresis curve, and Hk is a magnitude of anisotropic magnetic field obtained linear extrapolation in a high magnetic field region of the rotational hysteresis curve. The magnetic de-coupling is expressed by the ratio (Hp/Hk).

The thickness of a non-magnetic grain boundary phase was determined as the thickness (distance between C–C') of a grain boundary phase observed as a half-tone phase in the TEM picture of a dark field image of the cross-section of the magnetic film shown in FIG. 1. On the contrary, the thickness of a non-magnetic phase was obtained on the basis of a composition of a portion in the vicinity of grain boundaries measured using EDS by a TEM.

First, the concentrations of Co, Cr and (V, Ta, Mo or W) between A–A' putting grain boundaries therebetween shown in FIG. 1 were analyzed at intervals of 1 nm using an electron microscope having a probe diameter of 0.7 nm. On the basis of the analysis values, a value of {[solute Cr+solute second added element]/[total Co–intermetallic compound Co+solute Cr+solute second added element]} was calculated at each measurement point between A–A'. The results are shown in FIG. 3. In this graph, a distance between regions B–B' where [solute Cr +solute second added element] is more than 25 atomic % (position of 0.25 in FIG. 2) is taken as the thickness of the non-magnetic phase. The results are shown in Table 3 (Inventive Example) and Table 4 (Inventive Example). In these tables, character "-" means that measurement is not performed.

TABLE 3

| | | magnetic Characteristics | | | Thickness of Grain Boundary Phase (nm) | |
|---|---|---|---|---|---|---|
| | No. | Bs (kG) | Hc (kOe) | Hp/Hk | Amorphous | Non-Magnetic |
| Inventive Example | 1 | 9.4 | 1.60 | 0.30 | 2 | 2.5 |
| | 2 | 9.3 | 1.59 | 0.31 | — | — |
| | 3 | 7.3 | 1.76 | 0.36 | 3 | 2.8 |
| | 4 | 5.1 | 1.95 | 0.43 | — | — |
| | 5 | 5.0 | 1.92 | 0.42 | 3 | 3.3 |
| | 6 | 9.4 | 1.76 | 0.35 | 2 | 2.5 |
| | 7 | 8.2 | 2.02 | 0.42 | — | — |
| | 8 | 7.4 | 2.23 | 0.41 | 3 | 2.7 |
| | 9 | 6.6 | 2.06 | 0.43 | — | — |
| | 10 | 5.0 | 1.98 | 0.43 | 3 | 3.3 |
| | 11 | 5.0 | 2.12 | 0.48 | 3 | 3.5 |
| | 12 | 6.1 | 2.10 | 0.47 | 3 | 3.5 |
| | 13 | 5.1 | 2.20 | 0.47 | 3 | 3.5 |
| | 14 | 5.7 | 2.00 | 0.46 | 3 | 3.5 |
| | 15 | 5.2 | 2.21 | 0.47 | 3 | 3.5 |
| | 16 | 8.0 | 1.60 | 0.40 | 2 | 2.7 |
| | 17 | 7.9 | 1.75 | 0.41 | 3 | 2.9 |
| | 18 | 9.3 | 1.55 | 0.42 | 2 | 2.9 |

TABLE 4

| | | magnetic Characteristics | | | Thickness of Grain Boundary Phase (nm) | |
|---|---|---|---|---|---|---|
| | No. | Bs (kG) | Hc (kOe) | Hp/Hk | Amorphous | Non-Magnetic |
| Comparative Example | 19 | 9.6 | 1.62 | 0.25 | 1 | 1.7 |
| | 20 | 4.5 | 1.95 | 0.44 | — | — |
| | 21 | 4.4 | 1.96 | 0.45 | 3 | 3.2 |
| | 22 | 9.7 | 0.70 | 0.23 | 0 | 0 |
| | 23 | 9.7 | 1.64 | 0.26 | 1 | 1.8 |
| | 24 | 9.8 | 0.71 | 0.22 | 0 | 0 |

TABLE 4-continued

| No. | Bs (kG) | Hc (kOe) | Hp/Hk | Thickness of Grain Boundary Phase (nm) Amorphous | Non-Magnetic |
|---|---|---|---|---|---|
| 25 | 9.7 | 1.30 | 0.18 | — | — |
| 26 | 4.6 | 1.88 | 0.42 | — | — |
| 27 | 4.3 | 1.80 | 0.43 | 3 | 3.3 |
| 28 | 4.6 | 2.20 | 0.46 | 3 | 3.3 |
| 29 | 4.3 | 1.40 | — | — | — |
| 30 | 1.9 | 1.10 | Impossible to be measured | — | — |
| 31 | 8.2 | 1.35 | 0.32 | 1 | 2.0 |
| 32 | 8.2 | 1.45 | 0.34 | 1 | 2.0 |
| 33 | 7.6 | 1.40 | 0.35 | 1 | 2.0 |
| 34 | 7.3 | 1.42 | 0.33 | 1 | 2.0 |

From these experiments, the following results were obtained.

The evaluation for the properties of the magnetic recording media having the magnetic film made of $Co_{87}Cr_8Mo_5$ alloy is shown by No. 1 in Table 3. The non-magnetic grain boundary phase has a thickness of 2.5 nm capable of achieving the intergranular magnetic de-coupling. From this sample, it is revealed that for a substrate temperature of 200° C. upon film formation, when the Hp/Hk as a magnetic de-coupling index is 0.30 or more, the thickness of the corresponding non-magnetic phase becomes a value of 2.5 nm or more.

The evaluation for the properties of the magnetic recording media having the magnetic film made of $Co_{87}Cr_8V_5$ alloy is shown by No. 2 in Table 3. In the sample, the Hp/Hk as a magnetic de-coupling index is 0.31, and consequently, the magnetic de-coupling can be sufficiently achieved.

The evaluation for the properties of the magnetic recording media having the magnetic film made of $Co_{82}Cr_{12}Mo_3V_3$ alloy is shown by No. 3 in Table 3. As compared with No. 1, the saturation magnetic flux density Bs is reduced, but each of the coercivity Hc, Hp/Hk, the thickness of an amorphous grain boundary phase, and the thickness of a non-magnetic grain boundary phase is increased.

The evaluation for the properties of the magnetic recording media having the magnetic film made of $Co_{77}Cr_{14}Mo_9$ alloy is shown by No. 4 in Table 3. As compared with No. 1, the saturation magnetic flux density Bs is reduced, but each of the coercivity Hc and Hp/Hk is increased.

The evaluation for the properties of the magnetic recording media having the magnetic film made of $Co_{77}Cr_{14}V_9$ alloy is shown by No. 5 in Table 3. As compared with No. 1, the saturation magnetic flux density Bs is reduced, but each of the coercivity Hc, Hp/Hk, the thickness of an amorphous grain boundary phase, and the thickness of a non-magnetic grain boundary phase is increased.

The evaluation for the properties of the magnetic recording media having the magnetic film made of $Co_{87}Cr_8W_5$ alloy is shown by No. 6 in Table 3. The non-magnetic grain boundary phase has a thickness of 2.5 nm capable of achieving the intergranular magnetic de-coupling. From this sample, it is revealed that for the substrate temperature of 200° C. upon film formation, when the Hp/Hk is 0.30 or more, the thickness of the corresponding non-magnetic grain boundary phase can be set to be 2.5 nm or more.

The evaluation for the properties of the magnetic recording media having the magnetic film made of $Co_{84}Cr_{10}W_6$ alloy is shown by No. 7 in Table 3. As compared with No. 6, the saturation magnetic flux density Bs is reduced, but each of the coercivity Hc and the Hp/Hk is increased.

The evaluation for the properties of the magnetic recording media having the magnetic film made of $Co_{82}Cr_{12}W_6$ alloy is shown by No. 8 in Table 3. As compared with No. 6, the saturation magnetic flux density Bs is reduced, but each of the coercivity Hc, the Hp/Hk, the thickness of an amorphous grain boundary phase, and the thickness of a non-magnetic grain boundary phase is increased.

The evaluation for the properties of the magnetic recording media having the magnetic film made of $Co_{80}Cr12W_8$ alloy is shown by No. 9 in Table 3. As compared with No. 8, the saturation magnetic flux density Bs is reduced, but the Hp/Hk is increased.

The evaluation for the properties of the magnetic recording media having the magnetic film made of $Co_{76}Cr_{14}W_{10}$ alloy is shown by No. 10 in Table 3. As compared with No. 6, the saturation magnetic flux density Bs is reduced, but each of the coercivity Hc, the Hp/Hk, the thickness of an amorphous grain boundary phase, and the thickness of a non-magnetic grain boundary phase is increased.

The evaluation for the properties of the magnetic recording media having the magnetic film made of $Co_{77}Cr_{18}Ta_3W_2$ alloy is shown by No. 11 in Table 3. As compared with No. 10, the Cr content is increased to 18 atomic %. When the total content of Cr and the second added elements (Ta and W) is 23 atomic %, the saturation magnetic flux density Bs is 5.0 kG which is sufficient to be practically usable, and further, the Hp/Hk is as high as 0.48, thus exhibiting an extremely high coercivity Hc. This is because, the increased content of Cr contributes to the formation of a thicker non-magnetic grain boundary phase.

The evaluation for the properties of the magnetic recording media having the magnetic film made of $Co_{79}Cr_{16}W_5$ alloy is shown by No. 12 in Table 3. As compared with No. 6, the Cr content is increased to 16 atomic %. When the total content of Cr and the second added element (W) is 21 atomic %, the saturation magnetic flux density Bs is 6.1 kG which is sufficient to be practically usable, and further, the Hp/Hk is as high as 0.47, thus exhibiting an extremely high coercivity Hc. This is because, the thickness of a non-magnetic grain boundary phase is increased from 2.5 nm to 3.5 nm by the effect of the increased Cr content.

The evaluation for the properties of the magnetic recording media having the magnetic film made of $Co_{77}Cr_{17}W_6$ alloy is shown by No. 13 in Table 3. As compared with No. 12, each of the Cr content and the W content is increased by 1 atomic %, and the total content of Cr and the second added element (W) is increased up to 23 atomic %. However, the saturation magnetic flux density Bs is 5.1 kG which is sufficient to be practically usable. The Hp/Hk is as high as 0.47.

The evaluation for the properties of the magnetic recording media having the magnetic film made of $Co_{78}Cr_{18}Ta_2W_2$ alloy is shown by No. 14 in Table 3. The film has approximately the same composition as that of No. 11. The total content of Cr and the second additional elements (Ta and W) is 22 atomic %. In this sample, the saturation magnetic flux density Bs is 5.7 kG, which is slightly higher than that of No. 11, and a non-magnetic grain boundary phase having a sufficient thickness of 3.5 nm is observed.

The evaluation for the properties of the magnetic recording media having the magnetic film made of $Co_{77}Cr_{17}Ta_2W_4$ alloy is shown by No. 15 in Table 3. As compared with No. 14, the W content is increased to 4 atomic %. However, the total content of Cr and the second additional elements (Ta and W) is 23 atomic %. In this sample, the saturation magnetic flux density Bs is 5.2 kG, which is sufficient to be practically usable. Moreover, in this film, a high Hp/Hk and a high coercivity Hc comparable to No. 13 are obtained, and a non-magnetic grain boundary phase having a sufficient thickness of 3.5 nm is observed.

The evaluation for the properties of the magnetic recording media having the magnetic film made of $Co_{83}Cr_{14}V_1W_2$ alloy film is shown by No. 16 in Table 3. This film exhibits a high saturation magnetic flux density Bs, coercivity Hc and Hp/Hk. This is because, the total content of the second additional elements for accelerating the formation of a non-magnetic grain boundary phase is as small as 3 atomic %, but the substrate temperature is increased up to 250° C., so that a non-magnetic grain boundary phase having a sufficient thickness is formed. As a result, by increasing the substrate temperature up to 250° C., the Hp/Hk is increased as compared with the case of the substrate temperature of 200° C. This is because the particle size of crystal grains is increased by increasing the substrate temperature. Namely, in the case where the substrate temperature is increased up to 250° C., the Hp/Hk is required to be about 0.40 or more for achieving the sufficient magnetic de-coupling by increasing the thickness of the non-magnetic grain boundary phase up to a value of 2.5 nm or more.

The evaluation for the properties of the magnetic recording media having the magnetic film made of $Co_{83}Cr_{14}T_1W_2$ alloy is shown by No. 17 in Table 3. For the same reason described in No. 16, each of the saturation magnetic flux density Bs, coercivity Hc and the Hp/Hk is sufficiently high.

The evaluation for the properties of the magnetic recording media having the magnetic film made of $Co_{87}Cr_{16}W_3$ alloy is shown by No. 18 in Table 3. As compared with Nos. 16 and 17, the coercivity Hc is reduced but each of the saturation magnetic flux density Bs and Hp/Hk is increased.

The evaluation for the properties of the magnetic recording media having the magnetic film composed of $Co_{89}Cr_6V_5$ alloy is shown by No. 19 in Table 4. In this sample (Comparative Example), an amorphous non-magnetic grain boundary phase is present, but the thickness thereof is 1.7 nm which is insufficient for magnetic de-coupling.

The evaluation for the properties of the magnetic recording media having the magnetic film composed of $Co_{75}Cr_{14}Mo_{11}$ alloy is shown by No. 20 in Table 4. In this sample (Comparative Example), the saturation magnetic flux density Bs determining the output amplitude is as low as 4.5 kG, which is insufficient to be practically usable as the recording media.

The evaluation for the properties of the magnetic recording media having the magnetic film composed of $Co_{75}Cr_{16}V_9$ alloy is shown by No. 21 in Table 4. In this sample (Comparative Example), there exists an amorphous non-magnetic phase capable of achieving the sufficient intergranular magnetic de-coupling. However, similarly to No. 20, the saturation magnetic flux density Bs determining the output amplitude is lowered to a value less than the level practically usable as the recording media.

The evaluation for the properties of the magnetic recording media having the magnetic film composed of $Co_{85}Cr_{15}$ alloy is shown by No. 22 in Table 4. In this sample (Comparative Example), either amorphous phase or non-magnetic phase is not formed in grain boundaries.

The evaluation for the properties of the magnetic recording media having the magnetic film composed of $Co_{89}Cr_6Ta_5$ alloy is shown by No. 23 in Table 4. In this sample (Comparative Example), an amorphous non-magnetic grain boundary phase is present, but the thickness of the non-magnetic grain boundary phase is 1.8 nm, which is insufficient for magnetic de-coupling.

The evaluation for the properties of the magnetic recording media having the magnetic film composed of $Co_{89}Cr_6W_5$ alloy is shown by No. 25 in Table 4. In this sample (Comparative Example), the Hp/Hk is low and the magnetic de-coupling is insufficient.

The evaluation for the properties of the magnetic recording media having the magnetic film composed of $Co_{75}Cr_{14}W_{11}$ alloy is shown by No. 26 in Table 4. In this sample (Comparative Example), the saturation magnetic flux density Bs determining the output amplitude is as low as 4.6 kG, which is insufficient to be practically usable as the recording media.

The evaluation for the properties of the magnetic recording media having the magnetic film composed of $Co_{74}Cr_{16}W_{10}$ alloy is shown by No. 27 in Table 4. In this sample (Comparative Example), there exists an amorphous non-magnetic phase capable of achieving the sufficient intergranular magnetic de-coupling. However, similarly to No. 26, the saturation magnetic flux density Bs determining the output amplitude is lowered to a value less than the level practically usable as the recording media.

The evaluation for the properties of the magnetic recording media having the magnetic film composed of $Co_{75}Cr_{18}Ta_5W_2$ alloy is shown by No. 28 in Table 4. In this sample (Comparative Example), a non-magnetic phase having a sufficient thickness of 3.3 nm is observed and a high Hp/Hk and a high coercivity Hc are obtained. However, the saturation magnetic flux density Bs is as low as 4.6 kG, which is insufficient to be practically usable as the recording media. This is because, the total content of Cr and the second additional elements (Ta+W) reaches 25 atomic %, to lower the content of Co atoms for improving the magnetic properties, thereby reducing the saturation magnetization.

The evaluation for the properties of the magnetic recording media having the magnetic film composed of $Co_{75}Cr_{20}Ta_4$ alloy is shown by No. 29 in Table 4. In this sample (Comparative Example), the total content of Cr and the second additional element (Ta) is 24 atomic %, but the saturation magnetic flux density Bs is as low as 4.3 kG, which is insufficient to be practically usable. The reason why the saturation magnetic flux density Bs is largely reduced is that Cr atoms functioning to cancel the magnetization of Co atoms are excessively contained. This shows that the Cr content is required to be 18 atomic % or less.

The evaluation for the properties of the magnetic recording media having the magnetic film composed of $Co_{74}Cr_{22}W_1$ alloy is shown by No. 30 in Table 4. In this sample (Comparative Example), the total content of Cr and the second additional element (W) is 24 atomic %, but the saturation magnetic flux density Bs is as extremely low as 1.9 kG, which is insufficient to be practically usable as the recording media. The reason why the saturation magnetic flux density Bs is largely reduced is that Cr atoms functioning to cancel the magnetization of Co atoms are excessively contained. In other words, when the Cr content is more than 18 atomic %, the saturation magnetic flux density Bs is significantly reduced, irrespective of the added amount of the second additional elements.

The evaluation for the properties of the magnetic recording media having the magnetic film composed of $Co_{84}Cr_{14}Mo_2$ alloy is shown by No. 31 in Table 4. In this sample (Comparative Example), since the substrate temperature is set at 250° C. upon film formation, the particle size of crystal grains is increased, and thereby the Hp/Hk is higher than in the case of the substrate temperature of 200° C.; however, the thickness of a non-magnetic grain boundary phase is 2.0 nm, which is insufficient for magnetic de-coupling. Namely, even in the case where the substrate temperature upon film formation is increased up to 250° C., when the total content of the second additional elements is less than 3 atomic %, it is difficult to form the sufficient non-magnetic grain boundary phase having a thickness of 2.5 nm or more.

The evaluation for the properties of the magnetic recording media having the magnetic film composed of $Co_{84}Cr_{14}Ta_2$ alloy is shown by No. 32 in Table 4. In this sample (Comparative Example), similarly to No. 31, an amorphous non-magnetic grain boundary phase is present, but the thickness of the non-magnetic grain boundary phase is 2.0 nm, which is insufficient for magnetic de-coupling.

The evaluation for the properties of the magnetic recording media having the magnetic film composed of $Co_{83}Cr_{15}W_2$ alloy is shown by No. 33 in Table 4. In this sample (Comparative Example), similarly to Nos. 31 and 32, an amorphous non-magnetic grain boundary phase is present; but the thickness of the non-magnetic grain boundary phase is 2.0 nm, which is insufficient for magnetic de-coupling.

The evaluation for the properties of the magnetic recording media having the magnetic film composed of $Co_{82}Cr_{16}Ta_1W_1$ alloy is shown by No. 34 in Table 4. In this sample (Comparative Example), similarly to Nos. 31 to 33, an amorphous non-magnetic grain boundary phase is present, but the thickness of the non-magnetic grain boundary phase is 2.0 nm, which is insufficient for magnetic de-coupling.

By comparison of Inventive Example with Comparative Example (Nos. 22 and 24), it is revealed that an amorphous phase can be formed in grain boundaries by the addition of the second additional elements such as V, Ta, and W in a suitable amount, thus increasing the Cr content in the grain boundary phase. Moreover, the distance between the amorphous grain boundary phase corresponds to the width of a non-magnetic region obtained by the composition analysis performed in the vicinity of grain boundaries in Comparative Example (Nos. 19, 22, 23, 25, 27 and 28) and Inventive Example (Nos. 1, 3, 5, 6, 8 and 10 to 18). Accordingly, it is apparent that the amorphous phase thus formed accelerates the segregation of Cr and the whole amorphous phase substantially becomes the non-magnetic phase.

The measured results of Hp/Hk shown in Tables 3 and 4, show that the increased amount of the second additional elements such as V, Ta, Mo and W and also Cr accelerates the de-coupling of the magnetic phase. In particular, as shown in Nos. 1 to 18 (Inventive Example), when the Cr content is 8 atomic % or more and the content of the second additional elements is 3 atomic % or more (in particular, when the content of the second additional elements is less than 3 to 5 atomic %, the substrate temperature is increased), an amorphous non-magnetic grain boundary phase having a thickness of 2.5 nm or more can be formed, and the Hp/Hk of 0.30 or more (0.40 or more, in the case of the increased substrate temperature) can be obtained, thereby achieving the intergranular magnetic de-coupling necessary for reduction in noise.

On the contrary, as shown in Nos. 19, 22, 23 and 25 (Comparative Example) and Nos. 1 and 6 (Inventive Example), when the Cr content is less than 8 atomic % or the content of the second additional elements such as V, Ta, Mo and W is less than 3 atomic %, the Hp/Hk is less than 0.30, and the thickness of an amorphous non-magnetic grain boundary phase is less than 2.5 nm, which is insufficient for magnetic de-coupling, thus failing to obtain the magnetic recording media having a low noise property.

On the other hand, as shown in Tables 3 and 4, when the added amount of Cr and the second additional elements is increased, the saturation magnetic flux density Bs is reduced, which leads to reduction in the output amplitude. As shown in Nos. 20, 21, and 26 to 30 (Comparative Example), when the content of Cr is less than 14 atomic %, the content of the second additional elements is more than 10 atomic %, or the content of (Cr+second additional elements) is more than 24 atomic %, the saturation magnetic flux density Bs is less than 5000 G, which is insufficient to be practically usable. Moreover, as shown in Nos. 31 to 34 (Comparative Example), even in the case of the increased substrate temperature, when the content of the second additional elements is less than 3 atomic %, a non-magnetic grain boundary phase having a thickness of 2.5 nm or more cannot be formed, thus failing to achieve the sufficient magnetic de-coupling.

Figure 4:
FIG. 4 is an SEM picture of the fractured section of an inventive magnetic film formed on a Si substrate, as observed in the inclined direction.

FIG. 4 is an SEM picture of the fractured section of a magnetic film formed on a Si substrate, as seen from an inclined direction. As is apparent from FIG. 4, the magnetic film of the present invention is grown in a columnar manner. In FIG. 4, although the thin Co alloy film is formed on the Cr underlayer, the boundary between the Cr underlayer and the Co alloy film is unclear, and accordingly in this figure, the picture is affixed with the explanatory wording "cross-section of [Cr/Co alloy] thin film".

Figure 5:
FIG. 5 is a TEM picture of a dark field image of the cross-section of an inventive magnetic film formed on a NiP plating Al substrate through a Cr underlayer.

FIG. 5 is a TEM picture of a dark field image of the cross-section of an inventive magnetic film formed on an NiP plating Al substrate by way of a Cr underlayer. As is apparent from FIG. 5, the magnetic film is grown in a columnar manner relative to the Cr underlayer.

EXAMPLE 2

A non-magnetic substrate was prepared by a method wherein a Ni—P alloy was formed on the surface of an Al alloy substrate by electroless plating, and the surface thereof was subjected to mirror-like polishing. On this non-magnetic substrate, a Cr underlayer (thickness: 1000 Å), a magnetic film composed of a Co based alloy having each chemical composition, and a carbon protective film were formed by magnetron sputtering. The sample thus obtained was examined in terms of coercivity Hc, squareness, and magnetic de-coupling (Hp/Hk).

In the film formation, Ar was used as the sputtering gas; the gas pressure was set at 1 mTorr; the substrate temperature was set at 250° C.; and the substrate bias voltage was set at −200 V. The properties of the magnetic recording media were examined by a method wherein part of the substrate was cut-off and evaluated using a vibrating sample magnetometer (VSM). Each content of the alloy elements was determined by ICP emission spectroscopy. The evaluated result of each property will be described with reference to drawings.

Figure 6:
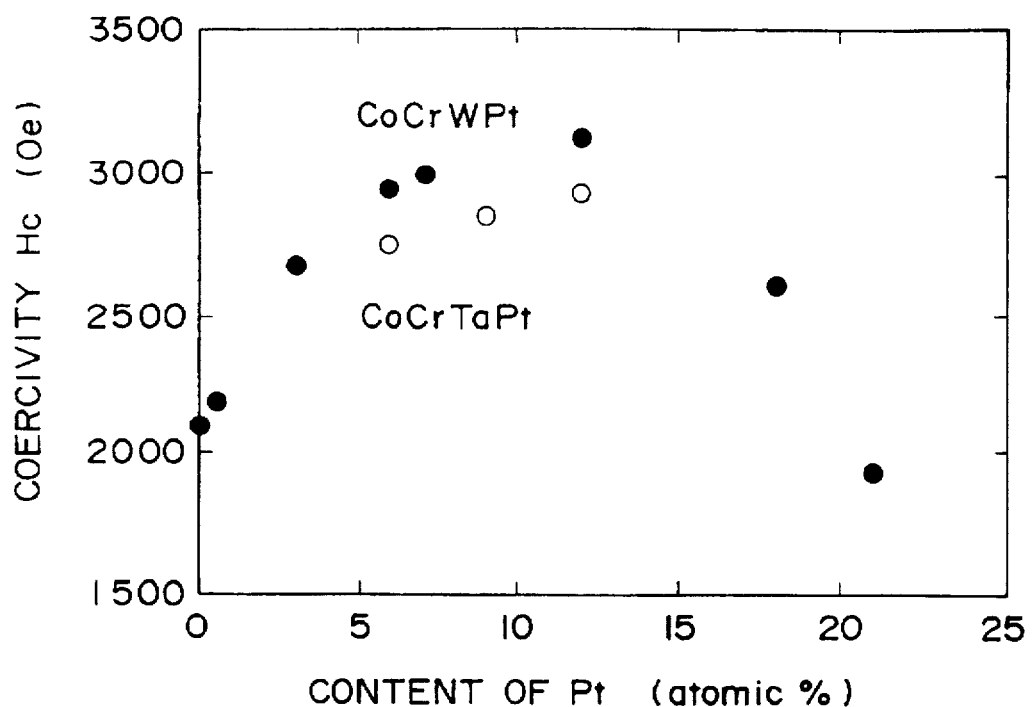
FIG. 6 is a graph showing the relationship between the content of Pt and an coercivity Hc in magnetic recording media in a second example.
Figure 7:
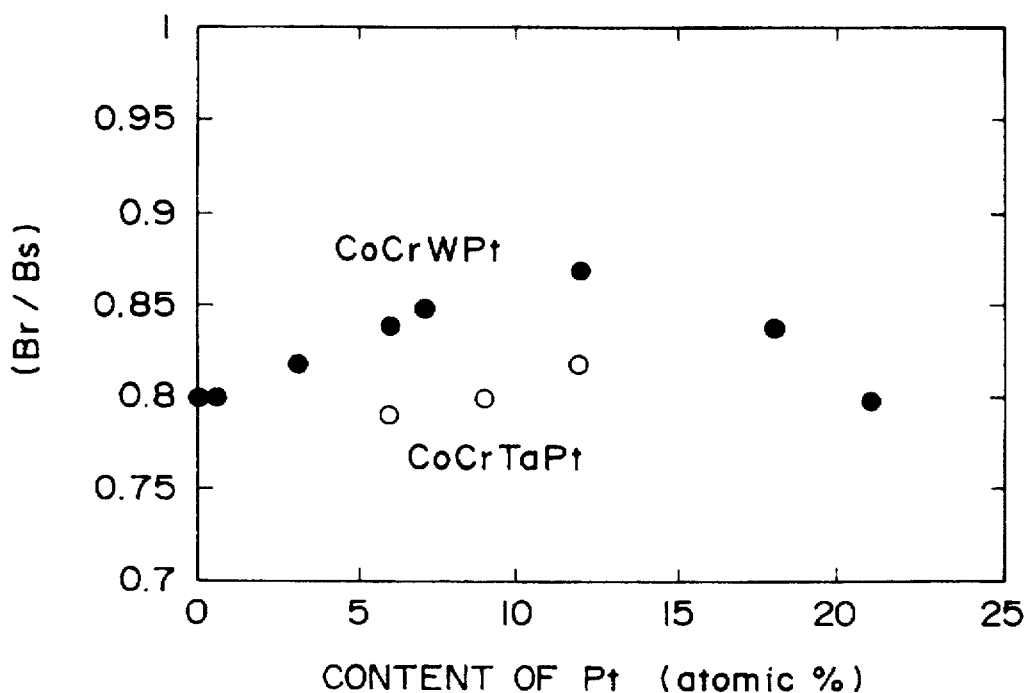
FIG. 7 is a graph showing the relationship between the content of Pt and a squareness ratio in the magnetic recording media in the second example.
Figure 8:
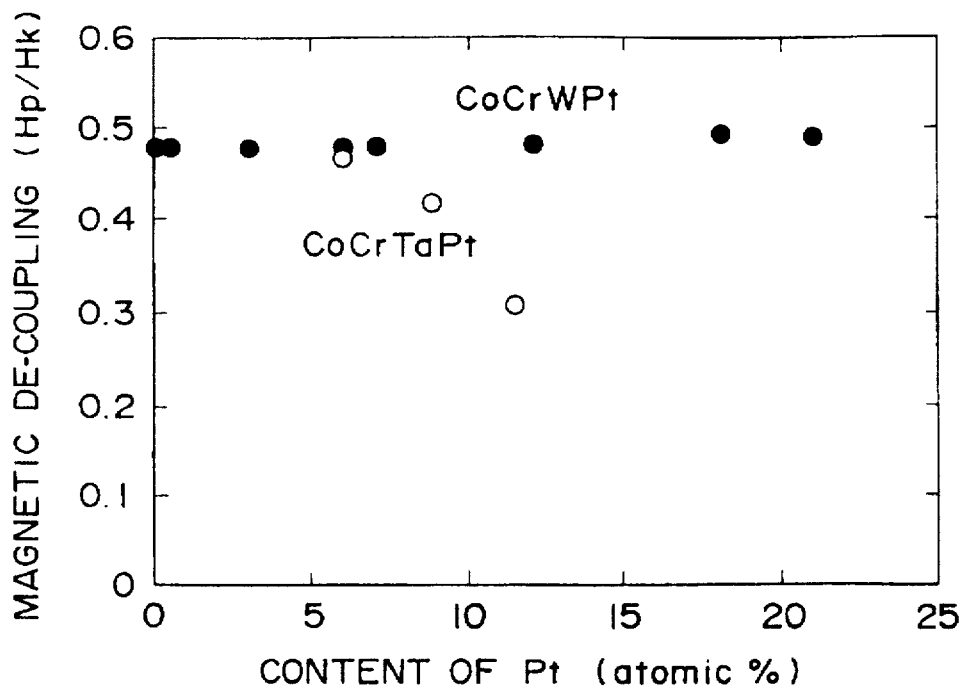
FIG. 8 is a graph showing the relationship between the content of Pt and a magnetic de-coupling in the magnetic recording media in the second example.

FIGS. 6 to 8 show each variation in coercivity Hc, squareness, and magnetic de-coupling relative to the Pt content of the Co—Cr—W—Pt alloy. At this time, the residual magnetic flux density per unit area was specified at 150 G μm. Moreover, the film formation was made using an alloy target containing 12 atomic % of Cr and 6 atomic % of W, the balance being Co. The Pt content was changed by adjusting the number of Pt chips placed on the alloy target, and accordingly, the contents of Co, Cr and W were changed excluding the point of 0% of the Pt content. The measurement was made for samples in Comparative Example using a Co alloy target composed of a Co—Cr—Ta—Pt alloy (12 atomic % of Cr, 6 atomic % of Ta, and 6 atomic % of Pt, the balance being Co) and also using the same alloy target on which Pt chips were placed such that the Pt content was changed into 9 atomic % and 12 atomic %. The squareness (see FIG. 6) was evaluated on the basis of a squareness ratio S expressed by the ratio between the magnetic flux density Br and the saturation magnetic flux density Bs.

As is apparent from these results, in the Co—Cr—W—Pt alloy, when the added amount of Pt is in the range of from 0.5 to 12 atomic %, each of the coercivity Hc and squareness ratio S is gradually increased (see FIGS. 6 and 7), and is then reduced, and when the Pt content reaches 20 atomic %, the coercivity Hc is lowered more than in the case of no addition of Pt. The magnetic de-coupling is little changed (see FIG. 8). On the other hand, in the Co—Cr—Ta—Pt alloy, as the Pt content is increased, the magnetic de-coupling is lowered.

Figure 9:
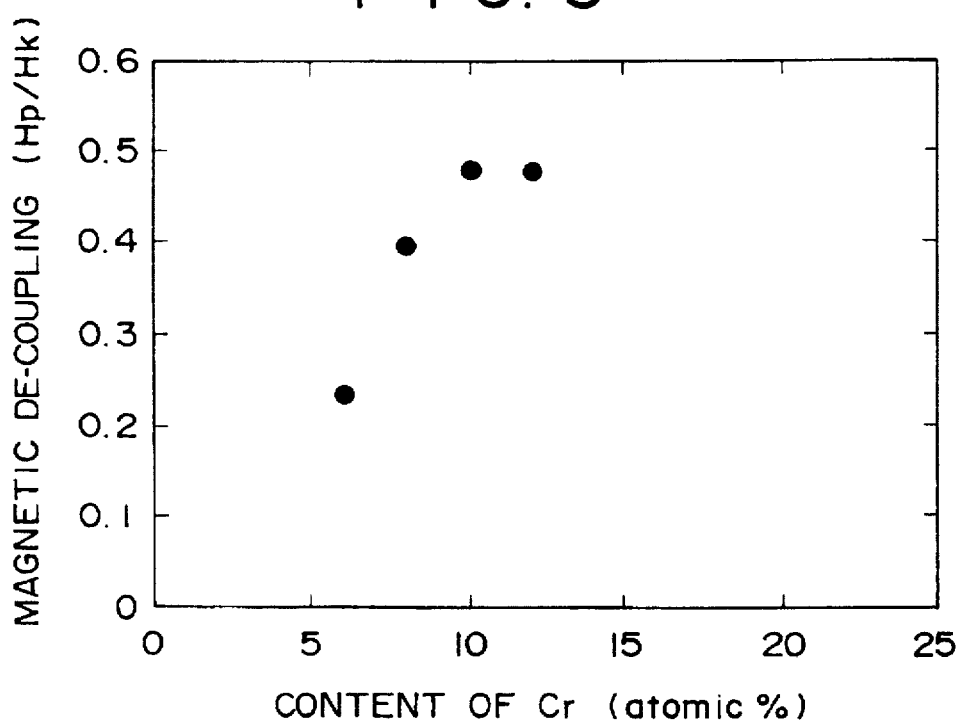
FIG. 9 is a graph showing the relationship between the content of Cr and a magnetic de-coupling (Hp/Hk) in the magnetic recording media in the second example.

FIG. 9 shows a variation in magnetic de-coupling (Hp/Hk) in the case where a target containing 6 atomic % of Cr, 3 atomic % of W and 6 atomic % of Pt, the balance being Co is used and the Cr content is changed by adjusting the number of Cr chips placed on the target.

As is apparent from this result, in the case where the W content is a value corresponding to the lower limit specified by the present invention, when the Cr content is less than.8 atomic %, the segregation of Cr to grain boundaries is lowered, thus reducing the magnetic de-coupling (Hp/Hk).

Figure 10:
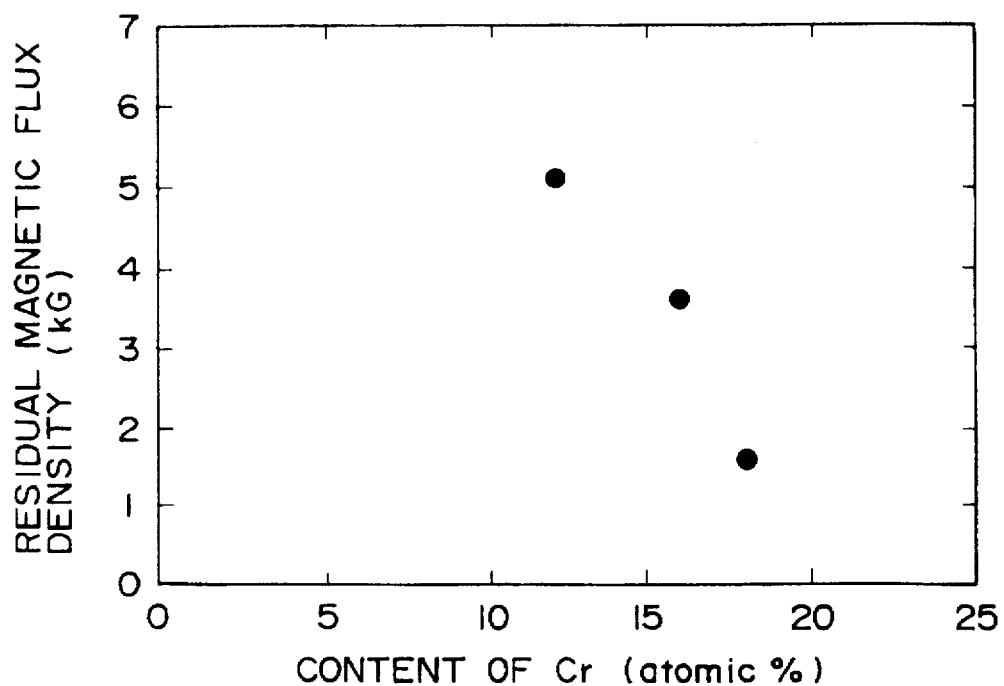
FIG. 10 is a graph showing the relationship between the content of Cr and a residual magnetic flux density in the magnetic recording media in the second example.

FIG. 10 shows a variation in the residual magnetic flux density in the case where a target containing 12 atomic % of Cr, 10 atomic % of W and 20 atomic % of Pt, the balance being Co is used and the Cr content is changed by adjusting the number of Cr chips placed on the target.

As is apparent from this result, when the Cr content is more than 18 atomic %, the residual magnetic flux density of the alloy is significantly reduced to a value less than the level practically usable.

Figure 11:
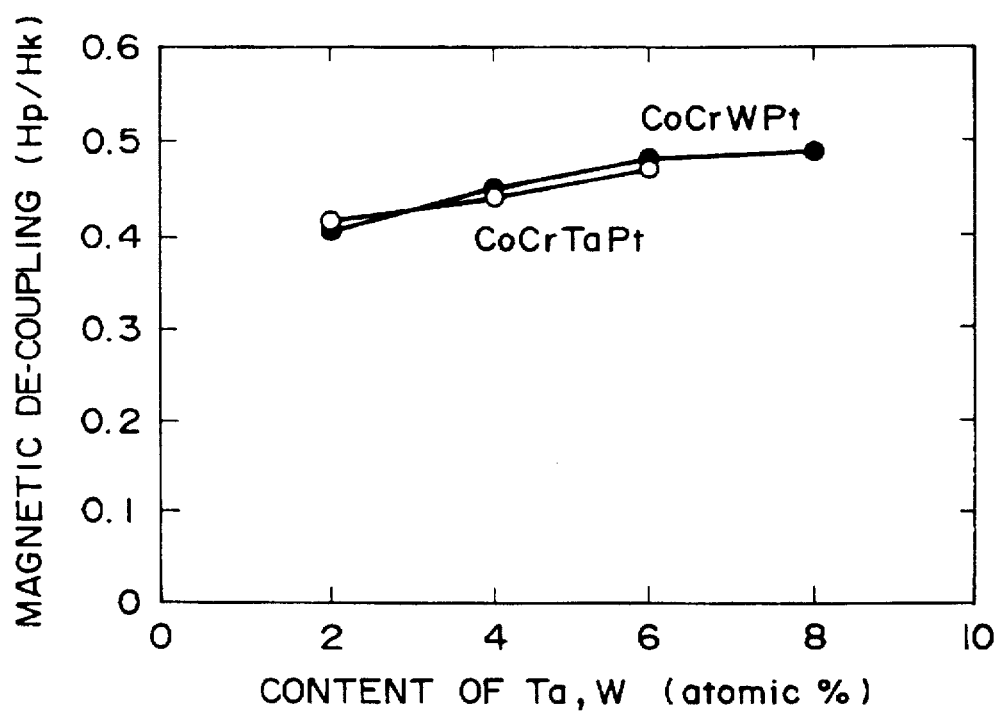
FIG. 11 is a graph showing the relationship between the content of Ta or W and a magnetic de-coupling (Hp/Hk) in the magnetic recording media in the second example.

FIG. 11 shows a variation in the magnetic de-coupling (Hp/Hk) relative to the content of Ta or W, in a Co—Cr—Ta—Pt alloy and a Co—Cr—W—Pt alloy. In either case, a target containing 12 atomic % of Cr, and 6 atomic % of Pt, the balance being Co was used and each content was changed by adjusting the number of Ta or W chips placed on the target.

As is apparent from this result, when the W content is more than 3 atomic %, the sample added with W is superior to the sample added with Ta in terms of the magnetic de-coupling (Hp/Hk). In addition, when the W content is more than 10 atomic %, each of the coercivity Hc and the squareness is significantly reduced.

EXAMPLE 3

A non-magnetic substrate was prepared by a method wherein a Ni—P alloy was formed on the surface of an Al alloy substrate by electroless plating, and the surface thereof was subjected to mirror-like polishing. On this non-magnetic substrate, a Cr underlayer, a magnetic film composed of a Co based alloy having each chemical composition shown in Table 5 (Inventive Example) and Table 6 (Comparative Example), and a carbon protective film were formed by magnetron sputtering. The sample was examined in terms of coercivity Hc, squareness ratio S, increasing ratio of the lattice constant of the Co based alloy, magnetic de-coupling (Hp/Hk) and the output amplitude.

TABLE 5

|  | No. | Alloy Composition (Atomic %) | | | |
|---|---|---|---|---|---|
|  |  | Co | Ni | Cr | W |
| Inventive Example | 1 | 74 | 10 | 10 | 6 |
|  | 2 | 72 | 10 | 10 | 8 |
|  | 3 | 70 | 10 | 10 | 10 |
|  | 4 | 62 | 20 | 12 | 6 |
|  | 5 | 60 | 20 | 12 | 8 |
|  | 6 | 58 | 20 | 12 | 10 |
|  | 7 | 77 | 5 | 12 | 6 |
|  | 8 | 77 | 10 | 10 | 3 |

TABLE 6

|  | No. | Alloy Composition (Atomic %) | | | | |
|---|---|---|---|---|---|---|
|  |  | Co | Ni | Cr | W | Ta |
| Comparative Example | 9 | 76 | 0 | 18 | 6 | — |
|  | 10 | 78 | 0 | 18 | 4 | — |
|  | 11 | 91 | 0 | 5 | 4 | — |
|  | 12 | 79 | 10 | 10 | 1 | — |
|  | 13 | 66 | 20 | 12 | 2 | — |
|  | 14 | 68 | 10 | 10 | 12 | — |
|  | 15 | 56 | 20 | 12 | 12 | — |
|  | 16 | 77 | 5 | 16 | 2 | — |
|  | 17 | 74 | 10 | 10 | — | 6 |
|  | 18 | 73 | 10 | 10 | — | 7 |
|  | 19 | 72 | 10 | 10 | — | 8 |
|  | 20 | 66 | 20 | 8 | — | 6 |
|  | 21 | 60 | 20 | 14 | — | 6 |
|  | 22 | 80 | 0 | 16 | — | 4 |
|  | 23 | 79 | 10 | 10 | — | 1 |
|  | 24 | 78 | 10 | 10 | — | 2 |
|  | 25 | 76 | 10 | 10 | — | 4 |

The thickness of the Cr underlayer was set at 1000 Å and the thickness of the carbon protective film was set at 150 Å. The thickness of the Co alloy magnetic film was adjusted such that the residual magnetization Brt per unit area become 200 Gμm. The sputtering film formation was carried out at a back pressure of $5 \times 10^{-7}$ Torr or less, Ar gas pressure of 1 mTorr, substrate temperature of 250° C. and substrate bias voltage of −200 V. In addition, upon formation of the above magnetic film, a target having the same composition as that of the magnetic film was used.

The coercivity Hc and the squareness ratio S were measured using the above-described vibrating sample magnetometer (VSM). In this case, a signal from a blank material formed under the same condition except for using the same substrate formed with no magnetic film was measured, and it was taken as the background in the above measurement. The measurement for the lattice constant of the alloy film was made by a method wherein an alloy single layer was formed on a glass substrate at room temperature, and lattice spacing of Co (002) was measured by X-ray diffraction. The output amplitude was measured using a thin film head under the condition of the flying height of 2 μinch and recording density of 40 kFCI. These results are shown in Table 7 (Inventive Example) and Table 8 (Comparative Example).

TABLE 7

|  | No. | Hc (kOe) | S | Increasing Ratio (%) of Lattice Constant | Hk (kOe) | Hp/Hk | Output Amplitude (mV) |
|---|---|---|---|---|---|---|---|
| Inventive Example | 1 | 2.30 | 0.84 | 0.75 | 4.4 | 0.44 | 23 |
|  | 2 | 2.20 | 0.82 | 0.95 | 4.4 | 0.45 | 23 |
|  | 3 | 2.00 | 0.82 | 1.25 | 4.4 | 0.45 | 22 |
|  | 4 | 2.30 | 0.83 | 0.75 | 4.8 | 0.44 | 24 |
|  | 5 | 2.40 | 0.82 | 0.90 | 4.8 | 0.44 | 24 |
|  | 6 | 2.10 | 0.81 | 1.30 | 4.7 | 0.45 | 23 |
|  | 7 | 2.10 | 0.86 | 0.75 | 4.1 | 0.43 | 24 |
|  | 8 | 2.00 | 0.88 | 0.35 | 4.1 | 0.40 | 24 |

TABLE 8

|  | No. | Hc (kOe) | S | Increasing Ratio (%) of Lattice Constant | Hk (kOe) | Hp/Hk | Output Amplitude (mV) |
|---|---|---|---|---|---|---|---|
| Comparative Example | 9 | 1.80 | 0.85 | 0.80 | 3.7 | 0.45 | 21 |
|  | 10 | 1.75 | 0.86 | 0.45 | 3.5 | 0.40 | 22 |
|  | 11 | 1.60 | 0.87 | 0.40 | 3.7 | 0.35 | 22 |
|  | 12 | 1.75 | 0.86 | 0.10 | 4.4 | 0.35 | 21 |
|  | 13 | 1.90 | 0.89 | 0.22 | 4.8 | 0.36 | 22 |
|  | 14 | 1.15 | 0.65 | 1.55 | 4.3 | 0.41 | 20 |
|  | 15 | 1.25 | 0.60 | 1.55 | 4.7 | 0.42 | 20 |
|  | 16 | 1.90 | 0.88 | 0.25 | 4.0 | 0.38 | 21 |
|  | 17 | 2.05 | 0.75 | 1.30 | 4.2 | 0.43 | 19 |
|  | 18 | 1.85 | 0.69 | 1.51 | 4.2 | 0.44 | 19 |
|  | 19 | 1.22 | 0.55 | 1.80 | 4.0 | 0.40 | 17 |
|  | 20 | 2.10 | 0.73 | 1.25 | 4.7 | 0.41 | 19 |
|  | 21 | 2.10 | 0.71 | 1.30 | 4.6 | 0.43 | 19 |
|  | 22 | 1.65 | 0.81 | 0.80 | 3.8 | 0.40 | 19 |
|  | 23 | 1.75 | 0.82 | 0.25 | 4.4 | 0.36 | 20 |
|  | 24 | 1.80 | 0.79 | 0.50 | 4.4 | 0.37 | 20 |
|  | 25 | 1.80 | 0.78 | 0.85 | 4.3 | 0.37 | 19 |

From the above experiments, the following results were obtained. FIG. 12 is a graph showing an effect of the added amount of W or Ta in the alloy film on the increasing ratio of the lattice constant. The lattice constant of the alloy is increased nearly in proportion to an increase in the added amount of W or Ta. However, in the sample added with W, an increase in the lattice constant is approximately half or less that of the sample added with Ta. In addition, the lattice constant is little affected by the added amount of Ni or Cr.

Figure 13:
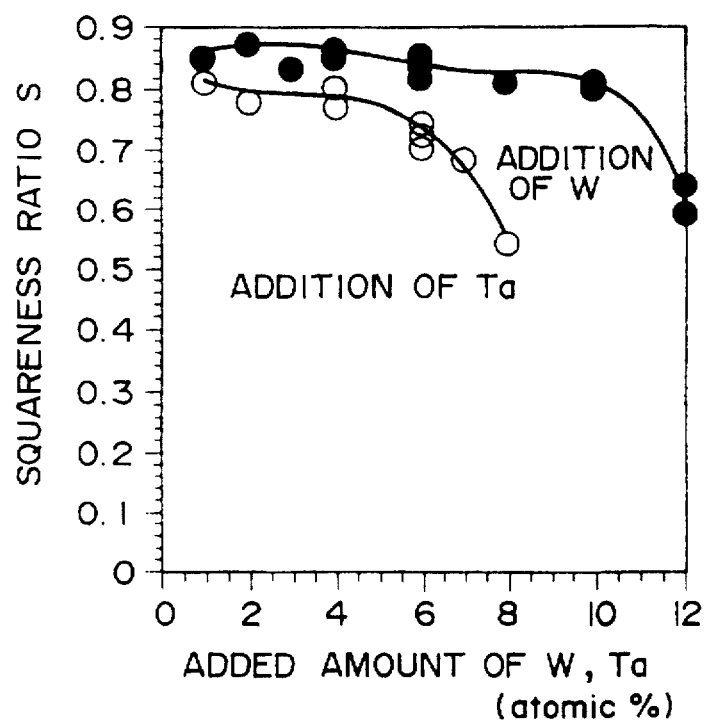
FIG. 13 is a graph showing an dependency of the added amount of W or Ta on the squareness ratio S of the magnetic recording media.

FIG. 13 is a graph showing the dependency of the added amount of W or Ta on the squareness ratio S of the magnetic recording media. As is apparent from this figure and FIG. 2, in the sample added with Ta, the squareness ratio S is significantly reduced by the significantly increased lattice constant. However, in the sample added with W, when the W content is 10 atomic % or less, a high squareness ratio of 0.8 or more can be obtained.

Figure 14:
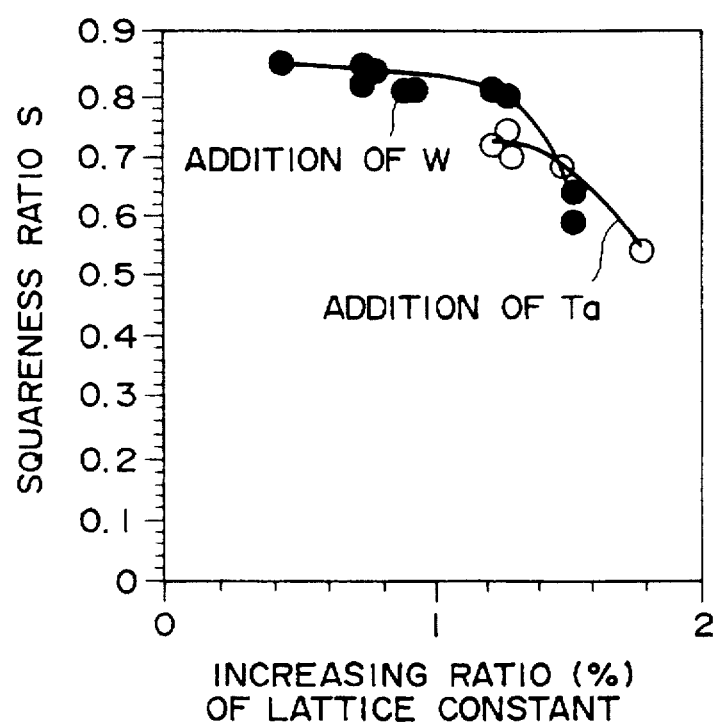
FIG. 14 is a graph showing the relationship between a squareness ratio S and an increasing ratio of a lattice constant in a sample having a magnetic de-coupling (Hp/Hk) of 0.4 or more.

FIG. 14 shows the relationship between the squareness ratio S and the increasing ratio of the lattice constant, with respect to the sample having the magnetic de-coupling of 0.4 or more. In the sample in which the magnetic de-coupling of 0.4 or more is realized by the addition of Ta, the lattice constant is significantly increased, and the squareness ratio S is lowered. On the contrary, in the sample added with W, a high squareness ratio S of 0.8 or more is obtained by suppressing the increasing ratio of the lattice constant to be 1.4% or less, that is, to be in the range of from 100 to 101.4% of the lattice constant of pure Co.

Figure 15:
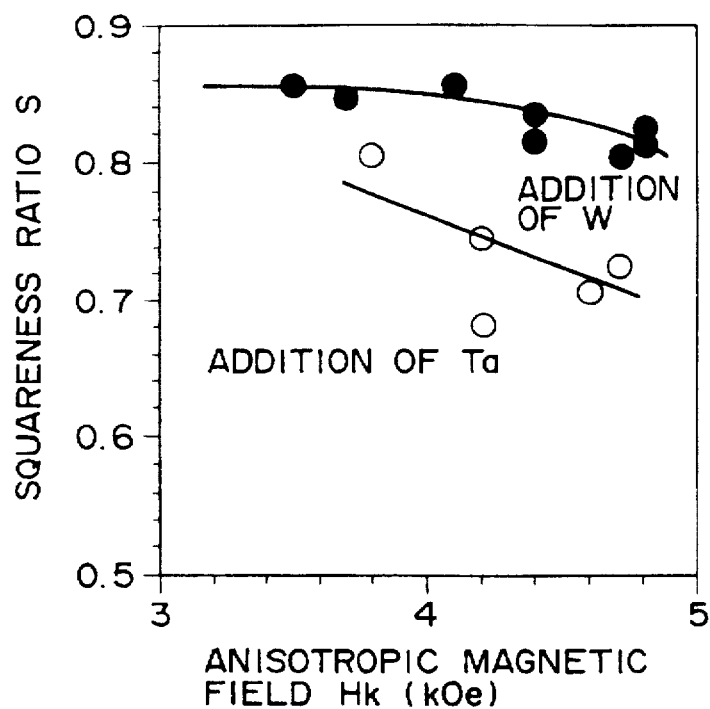
FIG. 15 is a graph showing an effect of an change in anisotropic magnetic field Hk on an change in squareness ratio S, with respect to a sample containing 10 atomic % of W in comparison with a sample containing Ta.

FIG. 15 is a graph showing the effect of a change in the anisotropic magnetic field Hk on a change in the squareness ratio S, with respect to the sample containing 10 atomic % or less of W in comparison with the sample added with Ta. With respect to the anisotropic magnetic field of 4 kOe or more, in the sample added with Ta, the increased anisotropic magnetic field Hk reduces the squareness ratio S; however, in the sample added with W, a high squareness ratio S of 0.8 or more is obtained.

Figure 16:
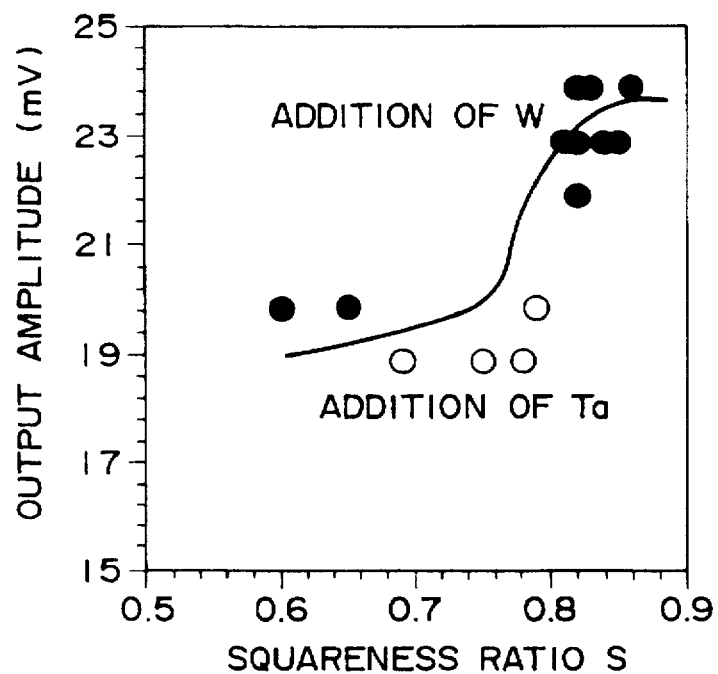
FIG. 16 is a graph showing the relationship between a squareness ratio S and a reproducing output in magnetic recording media having a high magnetic de-coupling (Hp/Hk)

FIG. 16 is a graph showing the relationship between the squareness ratio S and the output amplitude in the sample having a high magnetic de-coupling (Hp/Hk). As is apparent from this result, an extremely high output amplitude can be obtained in the W containing alloy having a squareness ratio S of 0.8 or more.

Figure 17:
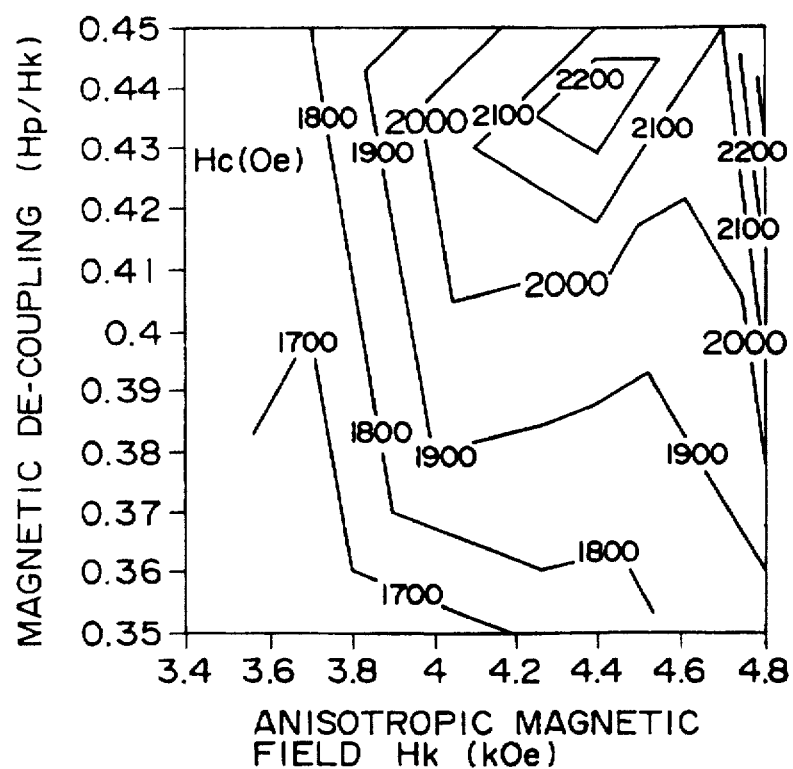
FIG. 17 is a graph showing the relationship between a coercivity Hc, anisotropic magnetic field Hk and magnetic de-coupling (Hp/Hk) with respect to a sample containing 10 atomic % or less of W and showing a squareness ratio of 0.8 or more among the magnetic recording media using W containing alloys.

FIG. 17 is a graph showing the relationship between a coercivity Hc, anisotropic magnetic field Hk and magnetic de-coupling (Hp/Hk) with respect to the sample containing 10 atomic % of W and having a squareness ratio of 0.8 or more. In each sample where the squareness ratio S is more than 0.8, the anisotropic magnetic field Hk is more than 4 kOe and the magnetic de-coupling (Hp/Hk) is 0.4 or more, a high coercivity of 2 kOe or more can be obtained, which is suitable for the high density recording media.

As described above, by the addition of W in a suitable amount, it becomes possible to obtain a magnetic film capable of ensuring a high squareness ratio S, a high anisotropic magnetic field Hk and a magnetic de-coupling (Hp/Hk), and hence to realize the excellent magnetic recording media having a high coercivity Hc and a high output amplitude.

The present inventors have examined Co—Ni—Cr—W alloys having various chemical compositions shown in Table 9 (Inventive Example) and Table 10 (Comparative Example) in terms of squareness ratio S, anisotropic magnetic field Hk, magnetic de-coupling (Hp/Hk) and saturation magnetic flux density Bs. The results are shown in Table 11 (Inventive Example) and Table 12 (Comparative Example). The magnetic film was formed under the same condition as described above, except that the film thickness of the alloy magnetic film was set at 500 Å.

TABLE 9

|  |  | Alloy Composition (Atomic %) | | | |
|---|---|---|---|---|---|
|  | No. | Co | Ni | Cr | W |
| Inventive Example | 26 | 76 | 10 | 8 | 6 |
|  | 27 | 72 | 10 | 12 | 6 |
|  | 28 | 66 | 10 | 18 | 6 |
|  | 29 | 74 | 10 | 8 | 8 |
|  | 30 | 70 | 10 | 12 | 8 |
|  | 31 | 72 | 10 | 8 | 10 |
|  | 32 | 68 | 10 | 12 | 10 |
|  | 33 | 48 | 30 | 12 | 10 |
|  | 34 | 66 | 20 | 8 | 6 |
|  | 35 | 62 | 20 | 12 | 6 |
|  | 36 | 56 | 20 | 18 | 6 |
|  | 37 | 81 | 5 | 8 | 6 |
|  | 38 | 77 | 5 | 12 | 6 |
|  | 39 | 73 | 10 | 14 | 3 |

TABLE 10

|  |  | Alloy Composition (Atomic %) | | | |
|---|---|---|---|---|---|
|  | No. | Co | Ni | Cr | W |
| Comparative Example | 40 | 54 | 20 | 20 | 6 |
|  | 41 | 68 | 10 | 10 | 12 |

TABLE 10-continued

| | Alloy Composition (Atomic %) | | | |
|---|---|---|---|---|
| No. | Co | Ni | Cr | W |
| 42 | 84 | 10 | 0 | 6 |
| 43 | 79 | 10 | 5 | 6 |
| 44 | 75 | 10 | 5 | 10 |
| 45 | 64 | 10 | 20 | 6 |
| 46 | 82 | 10 | 0 | 8 |
| 47 | 62 | 10 | 20 | 8 |
| 48 | 80 | 10 | 0 | 10 |
| 49 | 64 | 10 | 18 | 8 |
| 50 | 64 | 10 | 16 | 10 |
| 51 | 62 | 10 | 18 | 10 |
| 52 | 77 | 10 | 5 | 8 |
| 53 | 76 | 10 | 12 | 2 |
| 54 | 80 | 10 | 8 | 2 |
| 55 | 44 | 30 | 16 | 10 |
| 56 | 42 | 30 | 18 | 10 |

TABLE 11

| | No. | S | Hk (kOe) | Hp/Hk | Bs (kG) |
|---|---|---|---|---|---|
| Inventive | 26 | 0.84 | 4.4 | 0.41 | 8.6 |
| Example | 27 | 0.83 | 4.3 | 0.43 | 7.2 |
| | 28 | 0.83 | 4.2 | 0.44 | 5.1 |
| | 29 | 0.82 | 4.3 | 0.43 | 7.4 |
| | 30 | 0.83 | 4.3 | 0.44 | 6.1 |
| | 31 | 0.82 | 4.2 | 0.43 | 6.1 |
| | 32 | 0.80 | 4.1 | 0.44 | 5.2 |
| | 33 | 0.81 | 4.2 | 0.43 | 5.1 |
| | 34 | 0.80 | 4.8 | 0.42 | 8.3 |
| | 35 | 0.81 | 4.6 | 0.44 | 6.9 |
| | 36 | 0.82 | 4.3 | 0.45 | 5.0 |
| | 37 | 0.87 | 4.2 | 0.41 | 9.2 |
| | 38 | 0.88 | 4.2 | 0.42 | 7.9 |
| | 39 | 0.89 | 4.3 | 0.40 | 7.2 |

TABLE 12

| | No. | S | Hk (kOe) | Hp/Hk | Bs (kG) |
|---|---|---|---|---|---|
| Com- | 40 | 0.84 | 4.0 | 0.44 | 1.9 |
| parative | 41 | 0.65 | 4.3 | 0.41 | 5.2 |
| Example | 42 | 0.84 | 4.6 | 0.25 | 14.0 |
| | 43 | 0.84 | 4.6 | 0.37 | 11.7 |
| | 44 | 0.81 | 4.2 | 0.38 | 7.5 |
| | 45 | 0.82 | 4.0 | 0.44 | 2.4 |
| | 46 | 0.82 | 4.5 | 0.25 | 13.5 |
| | 47 | 0.81 | 3.9 | 0.45 | 1.9 |
| | 48 | 0.81 | 4.5 | 0.35 | 11.0 |
| | 49 | 0.82 | 4.1 | 0.45 | 4.3 |
| | 50 | 0.80 | 4.0 | 0.47 | 4.0 |
| | 51 | 0.80 | 3.8 | 0.48 | 1.7 |
| | 52 | 0.82 | 4.3 | 0.39 | 11.0 |
| | 53 | 0.85 | 4.4 | 0.37 | 7.5 |
| | 54 | 0.85 | 4.4 | 0.35 | 8.9 |
| | 55 | 0.79 | 4.1 | 0.45 | 3.6 |
| | 56 | 0.79 | 4.0 | 0.46 | 1.6 |

Figure 18:
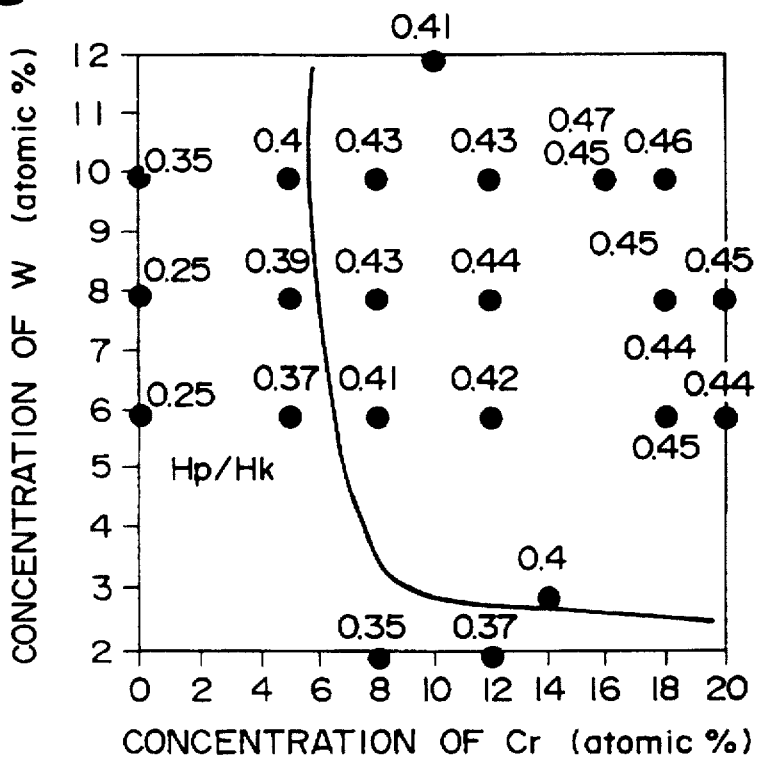
FIG. 18 is a graph showing an effect of the added amount of W or Cr on a magnetic de-coupling (Hp/Hk)

From the above experiments, the following results are obtained. FIG. 18 is a graph showing an effect of added amount of W or Cr on a magnetic de-coupling (Hp/Hk) with respect to all samples. As is apparent from this figure, when the Cr content is 8 atomic % or more and the W content is 3 atomic % or more, the magnetic de-coupling (Hp/Hk) of 0.4 or more can be obtained.

Figure 19:
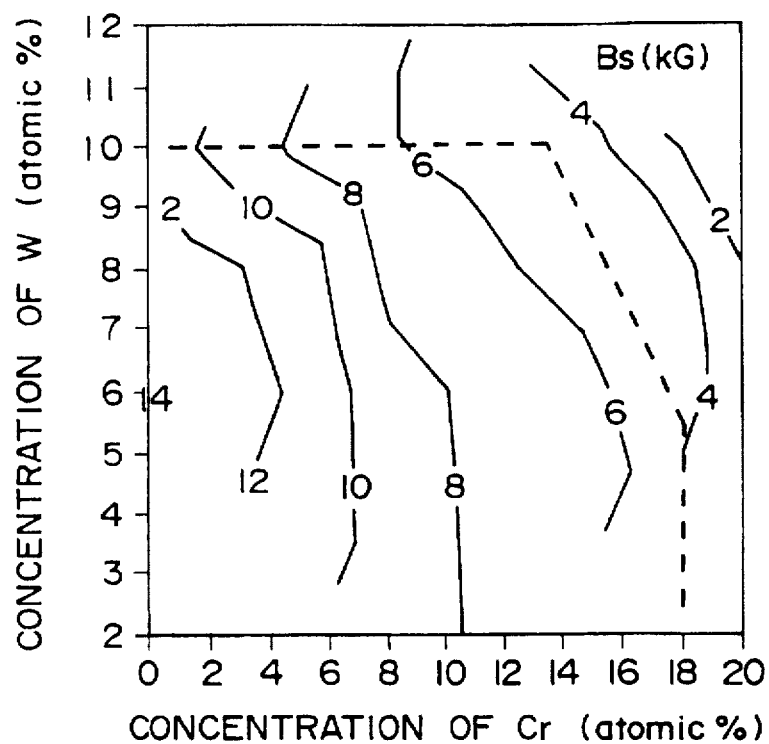
FIG. 19 is a graph showing an effect of the added amount of W or Cr on a saturation magnetic flux density.

FIG. 19 shows an effect of the added amount of W or Cr on a saturation magnetic flux density Bs. As is apparent from this figure, when the Cr content is 18 atomic % or less and the W content is 10 atomic % or less, and the total content of Cr and W is 24 atomic % or less (in the region shown by the dotted line), a saturation magnetic flux density Bs required for magnetic recording media, that is, 5 kG or more is obtained.

Figure 20:
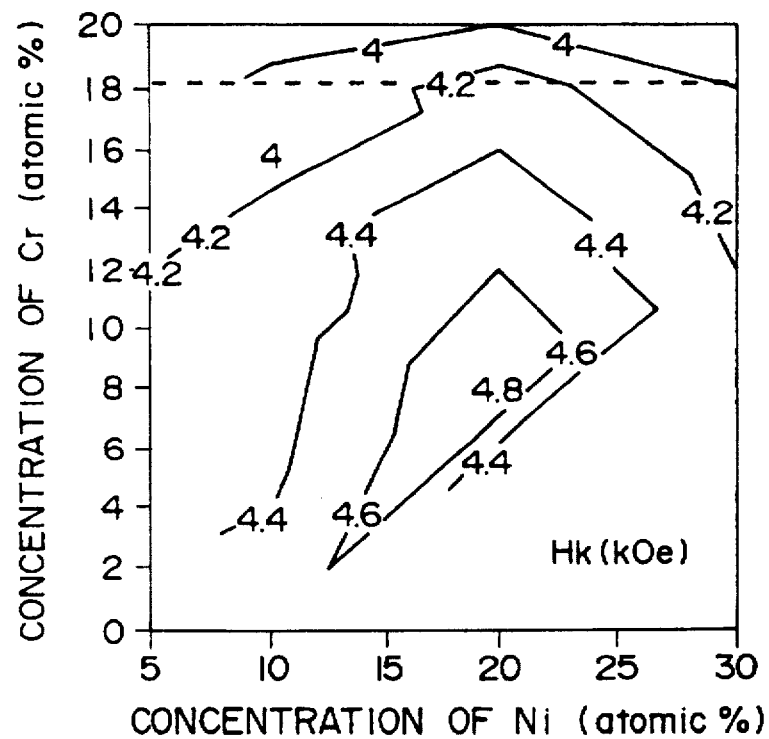
FIG. 20 is a graph showing the dependency of the content of Ni or Cr on an anisotropic magnetic field Hk in a sample in which the total content of Cr and W is 24 atomic % or less.

FIG. 20 is a graph showing the dependency of the content of Ni or Cr on an anisotropic magnetic field Hk with respect to a sample where the total content of Cr and W is 24 atomic % or less. As is apparent from this figure, when the Ni content is in the range of from 5 to 30 atomic % and the Cr content is 18 atomic % or less (in the region shown by the dotted line), an anisotropic magnetic field of 4 kOe or more is obtained.

Figure 21:
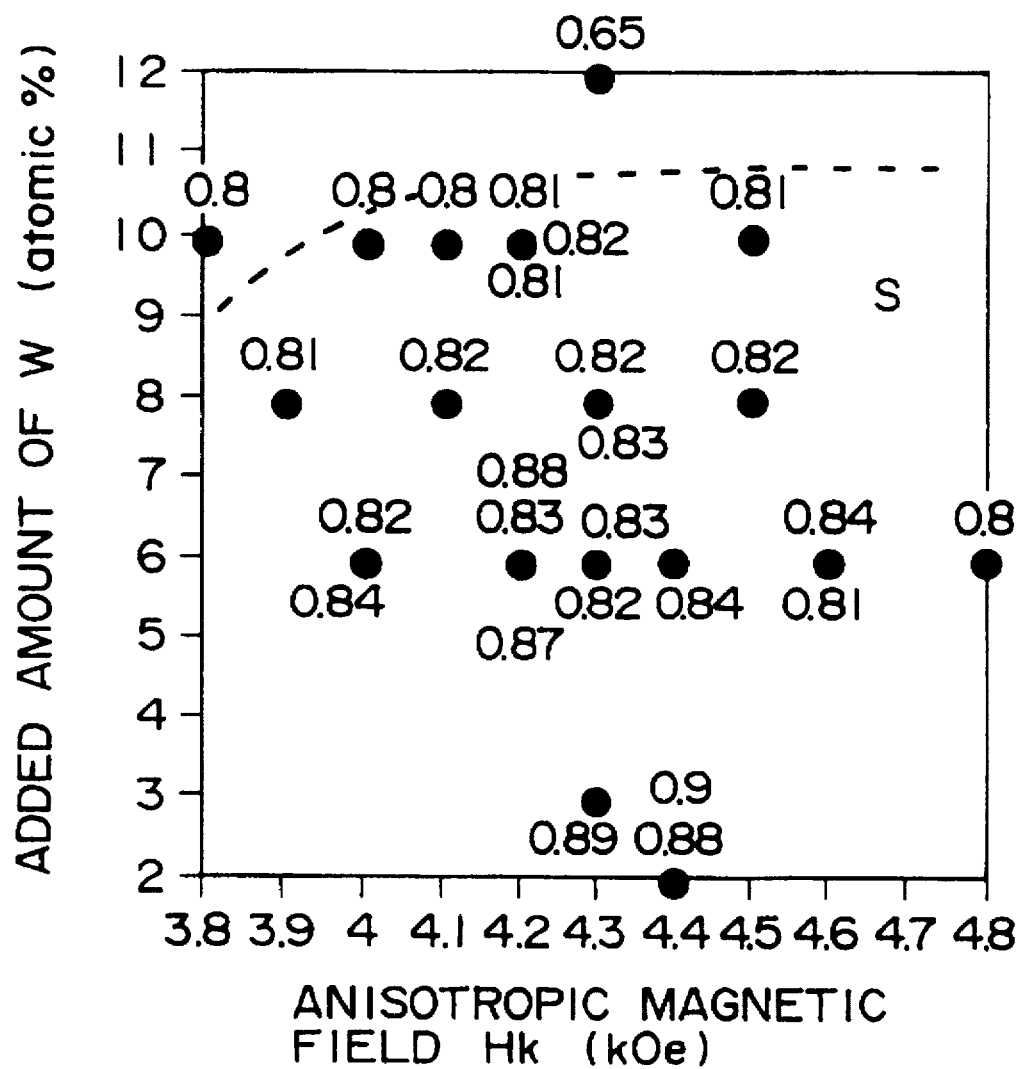
FIG. 21 is a graph showing the dependency of the added amount of W on a squareness ratio S.

FIG. 21 is a graph showing the dependency of the W content on a squareness ratio S with respect to all the samples. As is apparent from this figure, when the W content is 10 atomic % or less, a squareness ratio S of 0.8 or more is obtained.

Next, the present inventors have carried out the following experiments. First, a non-magnetic substrate was prepared by a method wherein a NiP alloy was formed on the surface of an Al alloy substrate by electroless plating, and the surface thereof was subjected to mirror-surface polishing and further to the texture treatment. On this non-magnetic substrate, a Cr underlayer, a magnetic film made of a Co based alloy having each chemical composition, and a carbon protective film were formed by magnetron sputtering. The film formation was made in the same manner as described above except that the film thickness of the alloy magnetic film was set at 500 Å. The sample was examined in terms of the squareness ratio S, anisotropic magnetic field Hk, magnetic de-coupling (Hp/Hk) and saturation magnetic flux density Bs.

The same examination was made for a sample obtained by forming a Cr underlayer, alloy magnetic film (500 Å), and carbon protective film on a substrate made of glass. The film formation and the measurement were made in the same manner as described above except that the film formation temperature was set at 300° C.

The results are shown in Table 13. As is apparent from Table 13, a large magnetic anisotropy Hk, a high magnetic de-coupling (Hp/Hk) and a high squareness ratio S are obtained.

TABLE 13

| | | | Alloy Composition (Atomic %) | | | | | Hk | Hp/ | Bs |
|---|---|---|---|---|---|---|---|---|---|---|
| | No. | Sub-strate | Co | Ni | Cr | W | S | (kOe) | Hk | (kG) |
| Inven- | 57 | Texture substrate | 76 | 10 | 8 | 6 | 0.95 | 4.4 | 0.41 | 8.6 |
| tive Exam- | | | | | | | | | | |
| ple | 58 | Texture substrate | 72 | 10 | 12 | 6 | 0.94 | 4.3 | 0.43 | 7.2 |
| | 59 | Texture substrate | 74 | 10 | 8 | 8 | 0.94 | 4.3 | 0.43 | 7.4 |
| | 60 | Glass substrate | 76 | 10 | 8 | 6 | 0.83 | 4.4 | 0.41 | 8.8 |
| | 61 | Glass substrate | 72 | 10 | 12 | 6 | 0.83 | 4.3 | 0.43 | 7.6 |
| | 62 | Glass substrate | 74 | 10 | 8 | 8 | 0.82 | 4.3 | 0.43 | 7.6 |

What is claimed is:

1. Magnetic recording media comprising:

a substrate made of a non-magnetic material; and a non-magnetic metal underlayer, a magnetic film and a protective film, which are sequentially laminated on said substrate.

said magnetic film being made of a Co based alloy consisting of:

Cr in an amount of 8–18 atomic %;

one kind or more of elements selected from the group consisting of Mo and W in an amount of 3–10 atomic %, or one kind or more of said elements and Ta in an amount of 3–10 atomic %;

Ni in an amount of 0 or 5 to 30 atomic %; or

Pt in an amount of 0 or 0.5–20 atomic %; and the balance being Co and inevitable impurities, wherein the total content of Cr and one kind or more of said elements selected from the group consisting of Mo and W, or the total content of Cr and one kind or more of said elements and Ta, is 24 atomic % or less.

2. Magnetic recording media according to claim 1, wherein said Co based alloy constituting said magnetic film further contains Pt in an amount of 0.5–20 atomic %.

3. Magnetic recording media according to claim 1, wherein said Co based alloy constituting said magnetic film contains Ni in an amount of 5–30 atomic %.

4. Magnetic recording media according to any of claims 1 to 3, wherein a ferromagnetic phase having a columnar crystal structure is formed, and a non-magnetic phase is formed in crystal boundaries of said ferromagnetic phase.

5. Magnetic recording media according to claim 4, wherein said non-magnetic phase has a thickness of 2.5 nm or more, and which is mainly composed of an amorphous phase containing intermetallic compound fine crystals of Co and one kind or more of elements selected from a group consisting of V, Mo and W, or of Co and one kind or more of said elements and Ta.

6. Magnetic recording media according to claim 5, wherein said non-magnetic metal underlayer is made of Cr.

7. Magnetic recording media according to any of claims 1 to 3, wherein the lattice constant of said Co based alloy constituting said magnetic film in the state before being added with Pt or a Co based alloy having the same composition as that of said Co based alloy constituting said magnetic film except that Pt is not contained, is 100–101.4% of that of pure Co having a hexagonal closed packed crystal structure, and said non-magnetic metal underlayer is made of Cr.

8. Magnetic recording media according to claim 7, wherein said magnetic film has a squareness ratio along the recording direction is 0.8 or more.

9. Magnetic recording media according to any of claims 1 to 3, wherein a magnitude of an anisotropic magnetic field in crystal grains forming said magnetic film, which is obtained by linear extrapolation in a high magnetic field region of a rotational hysteresis loss curve, is 4 kOe or more.

10. Magnetic recording media according to claim 9, wherein a magnetic de-coupling of crystal grains, which is defined by the ratio between a magnitude of a magnetic field imparting the maximum value of said rotational hysteresis loss curve and a magnitude of said anisotropic magnetic field, is 0.3 or more.

11. Magnetic recording media according to claim 10, wherein said magnetic de-coupling is 0.4 or more.

* * * * *